United States Patent
Reyes et al.

(10) Patent No.: US 9,432,808 B1
(45) Date of Patent: Aug. 30, 2016

(54) EDUCATION PROXIMITY SERVICES

(71) Applicant: MicroStrategy Incorporated, Vienna, VA (US)

(72) Inventors: Benjamin Reyes, Great Falls, VA (US); Hugh Owen, Vienna, VA (US); Jose Nocedal de la Garza, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

(21) Appl. No.: 14/793,489

(22) Filed: Jul. 7, 2015

Related U.S. Application Data

(60) Provisional application No. 62/021,692, filed on Jul. 7, 2014.

(51) Int. Cl.
*H04W 24/00* (2009.01)
*H04W 4/02* (2009.01)
*G06Q 50/20* (2012.01)

(52) U.S. Cl.
CPC ........... *H04W 4/021* (2013.01); *G06Q 50/205* (2013.01)

(58) Field of Classification Search
CPC ........... G06Q 30/0261; H04W 4/023; H04W 36/0055; H04W 48/08; H04L 9/0819
USPC ...................................... 455/456.3
See application file for complete search history.

(56) References Cited

U.S. PATENT DOCUMENTS

| | | | | |
|---|---|---|---|---|
| 8,781,502 | B1* | 7/2014 | Middleton | G06Q 30/0261 455/456.3 |
| 2014/0244819 | A1* | 8/2014 | Patrick | H04L 41/0806 709/223 |
| 2015/0181383 | A1* | 6/2015 | Schulz | H04W 4/021 455/456.3 |
| 2015/0351008 | A1* | 12/2015 | Mayor | H04W 48/16 455/41.2 |

* cited by examiner

*Primary Examiner* — Don N Vo
(74) *Attorney, Agent, or Firm* — Fish & Richardson P.C.

(57) ABSTRACT

Method, systems, and computer-readable media for receiving, from an application instance operating on a client device, education information that indicates a client device identifier, a wireless proximity beacon identifier, and a proximity of the identified client device to the identified wireless proximity beacon. From the received education information, a determination is made whether the proximity of the identified client device to the identified wireless proximity beacon satisfies a threshold proximity. Based at least on the determination, an action is determined that the application instance operating on the identified client device is permitted to perform while the proximity of the identified client device to the identified wireless proximity beacon satisfies the threshold proximity. Education information is transmitted to the identified client device that enables the application instance operating on the identified client device to perform the action.

18 Claims, 13 Drawing Sheets

EDUCATION PROXIMITY SERVICES

CROSS-REFERENCE TO RELATED APPLICATIONS

This application claims priority from U.S. Provisional Application No. 62/021,692, filed Jul. 7, 2014, and titled "Education Proximity Services," which is incorporated by reference.

TECHNICAL FIELD

This disclosure generally relates to providing location-based information or services.

BACKGROUND

The physical locations of mobile devices can be determined using various techniques. Information or other services can be provided to users of client devices based on the physical location of the user's client device.

DETAILED DESCRIPTION

Figure 1:
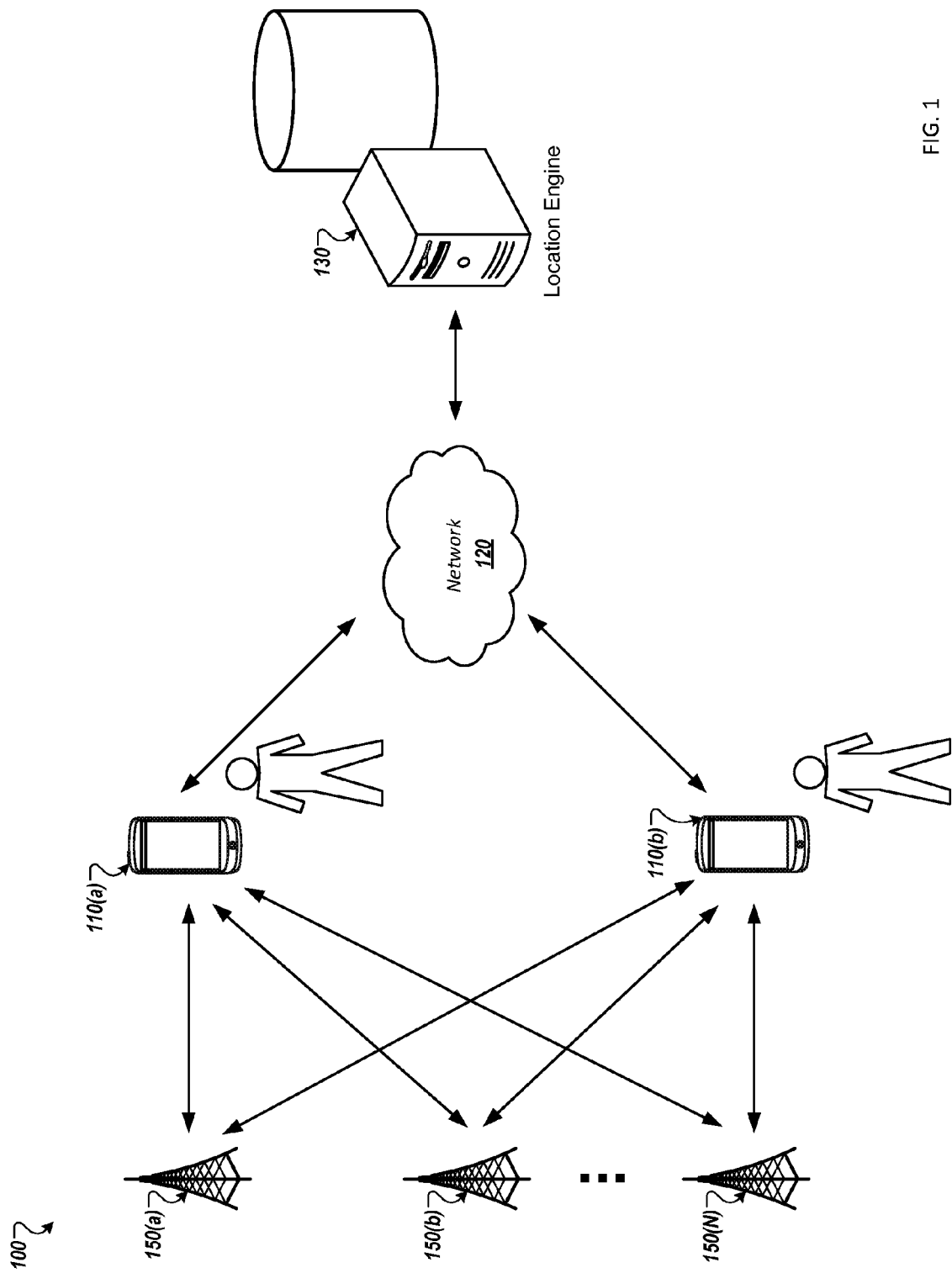
FIG. 1 illustrates an example system for providing proximity services using proximity detection technology.

Techniques are described for providing location-based services by utilizing proximity detection technology. A proximity detection system that includes one or more wireless sensor beacons can determine a client device's location based on the client device's proximity to one or more of the beacons. Based on the location of a particular client device, information can be provided to the client device, or other functionalities can be made accessible to the client device. Additionally, the locations of one or more client devices can be tracked and/or reported to one or more external systems, e.g., servers, such that the location information can be analyzed to determine various location statistics. For example, the proximity detection system can track the locations and/or movements of one or more client devices over time. The location statistics can further be combined with other information, such as user profile information associated with users of the one or more client devices, such that information in addition to the location information may be provided to users of the one or more client devices.

In some implementations, a proximity detection system is associated with a particular region, such as a building, venue, outdoor area, or other space, and includes one or more wireless sensor beacons. Each of the wireless sensor beacons is capable of emitting information identifying a particular beacon. A client device associated with a user can include software that is capable of detecting the presence of the wireless sensor beacons. Based on detecting the presence of one or more wireless sensor beacons, the client device can determine the client device's proximity to the one or more beacons. This proximity information can then be used to estimate the location of the user's client device relative to the one or more beacons.

In some implementations, each of the wireless sensor beacons is associated with a particular geographical location (e.g., latitude and longitude coordinates). As a result, determining the proximity of the client device to the one or more beacons enables for an estimation of a physical location of the client device. For example, the proximity detection system can estimate the location of a client device based on the client device's proximity to a particular beacon, or can be estimated using a trilateration or other multilateration process in which the client device's location is estimated based on the client device's proximity to three particular beacons. Other methods for estimating the location of a client device based on the proximity to one or more beacons are also possible.

Location information and/or other information (e.g., information associated with a user of a client device) can be exchanged between a client device and one or more servers that are accessible over a network. Location information can be tracked, for example, by storing a history of client device locations on a server, and statistical information can be determined regarding the locations and/or movements of one or more client devices. Information from the one or more servers can also be provided to one or more of the client devices over a network. Information provided to the client devices may be based at least in part on a location of the client device, or may be information provided based on detecting other events. In practice, other operations can be performed using a proximity detection system to locate one or more client devices. For example, various implementations can involve the use of a proximity detection system to provide location-based services in a school, campus, or other space associated with providing educational services.

FIG. 1 illustrates an example of a proximity detection system 100 configured to provide location-based services by utilizing proximity detection technology. The proximity detection system 100 includes one or more client devices 110(a)-(b), a network 120, a location engine 130, and one or more wireless sensor beacons 150(a)-(N). The network 120 enables communication between the one or more client devices 110(a)-(b) and the location engine 130. The one or more client devices 110(a)-(b) are capable of communicating with the one or more wireless sensor beacons 150(a)-(N) using techniques described herein.

The wireless sensor beacons 150(a)-(N) can be devices capable of emitting and/or receiving information over a wireless communication channel. For example, the wireless sensor beacons 150(a)-(N) can utilize Bluetooth Low Energy (BLE), also known as Bluetooth Smart, or other wireless technologies, e.g., Wi-Fi, near-field communications (NFC), or other wireless technologies, to communicate with the client devices 110(a)-(b). The wireless sensor beacons 110(a)-(N) may be commercially available beacon devices, for example, iBeacon devices as made available by Apple Inc., Gimbal Proximity Beacons as made available by Qualcomm Incorporated, PayPal Beacon devices as made available by PayPal, or other devices. The wireless sensor beacons 150(a)-(N) can communicate with client devices 110(a)-(b) by emitting messages (e.g., pings) that include information identifying the beacons 150(a)-(N). In some implementations, client devices 110(a)-(b) can communicate with the wireless sensor beacons 150(a)-(N) by receiving messages from the wireless sensor beacons 150(a)-(N) that identify one or more of the wireless sensor beacons 150(a)-(N).

In some implementations, for example, each of the wireless sensor beacons 150(a)-150(N) is associated with identification information that identifies a particular wireless sensor beacon or group of two or more wireless sensor beacons. In some instances, a particular wireless sensor beacon may be associated with multiple identifiers that identify one or more groups of wireless sensor beacons that each includes the particular wireless sensor beacon, and/or an identifier that identifies the particular wireless sensor beacon within the one or more groups of wireless sensor beacons. In some implementations, the beacons 150(a)-(N) may all be associated with the same unique universal identifier (UUID). As an example, each of the beacons 150(a)-(N) may be associated with a particular building, and may therefore all be associated with the same UUID to indicate that all of the wireless sensor beacons 150(a)-(N) are associated with the same building. Additionally, a subset of wireless sensor beacons, for example, the wireless sensor beacons 150(a) and 150(b), may be associated with a second identifier that may be termed a major identifier. This identifier may identify a smaller subset of the wireless sensor beacons 150(a)-(N), for example, to indicate that all of the wireless sensor beacons 150(a)-(N) sharing the same UUID are associated with the same building, and that the wireless sensor beacons 150(a) and 150(b) are on the same floor of the building. Another identifier, termed a minor identifier, may identify a particular wireless sensor beacon within the one or more groupings of wireless sensor beacons. For example, the wireless sensor beacons 150(a) and 150(b) that have the same UUID and major identifier may have unique minor identifiers to distinguish the wireless sensor beacon 150(a) from the wireless sensor beacon 150(b). In some implementations, the UUID, major identifier, minor identifier, or other identifiers associated with one or more wireless sensor beacons may be alphanumeric identifiers, or may include other information or data, e.g., a data packet that is unique to a particular wireless sensor beacon or group of wireless sensor beacons.

The identifiers used to identify wireless sensor beacons may be associated with geographical locations or other defined regions. For example, an identifier may be associated with a particular set of latitude and longitude coordinates, may be associated with a defined region (e.g., a particular building, room of a building, venue, outdoor area, or other space), or may be defined in another way, for example, based on a function of the defined region (e.g., an office space versus a dining area). The wireless sensor beacons 150(a)-(N) of FIG. 1, for example, may each be associated with a UUID, a major identifier, and a minor identifier. The UUID may be shared by all of the beacons 150(a)-(N) and may be associated with a region corresponding to a particular building (e.g., a set of latitude and longitude coordinates that define the area covered by the building). A major identifier may be shared by a subset of wireless sensor beacons, such as the wireless sensor beacons 150(a) and 150(b), and be associated with another location, for example, a set of latitude and longitude coordinates for a particular department within the particular building. The minor identifier of each of the wireless sensor beacons 150(a)-150(N) may be unique to each wireless sensor beacon, and may be associated with a particular geographical location that defines the precise location of a wireless sensor beacon. For example, each wireless sensor beacon 150(a)-(N) would have a unique minor identifier that each are associated with a different geographical location. In some implementations, only one or a subset of the identifiers may be associated with a physical location. For example, each of the minor identifiers that identify individual wireless sensor beacons may be associated with a physical location (e.g., latitude and longitude), while a UUID or major identifier that is shared by multiple wireless sensor beacons may not.

Each of the wireless sensor beacons 150(a)-(N) can broadcast information to allow client devices 110(a)-(b) to recognize one or more of the wireless sensor beacons 150(a)-(N). In some instances, wireless sensor beacons broadcast their information periodically, for example, every second, every 100 milliseconds, every minute, etc. The wireless sensor beacons 150(a)-(N) can broadcast this information using the wireless communications protocol that the wireless sensor beacon is configured to use (e.g., Bluetooth Low Energy). In some implementations, the information broadcast by a wireless sensor beacon can be broadcast with a particular broadcast frequency or power level. The information broadcast by a wireless sensor beacon can have a predefined format. For example, the information broadcast by each of the wireless sensor beacons 150(a)-(N) may utilize the same format that includes the wireless sensor beacons' UUID, major identifier, and/or minor identifier (e.g., in a particular order or using a particular hashing method). Information broadcast by the wireless sensor beacons may take other forms as well, for example, pings or other information. The information periodically broadcast by the wireless sensor beacons 150(a)-(N) can be received by the client devices 110(a)-(b) such that the client devices 110(a)-(b) can detect the presence of and/or the identity of one or more of the wireless sensor beacons 150(a)-(N).

The one or more client devices 110(a)-(b) are devices that host one or more applications, for example, one or more applications associated with providing location-based services using proximity detection technology. The one or more client devices 110(a)-(b) can be cellular devices or non-cellular locally networked devices. The client devices 110(a)-(b) can include a cell phone, a smart phone, a tablet PC, a personal digital assistant ("PDA"), or any other stationary or portable device configured to communicate with the mobile sensor beacons 150(a)-(N) and to communicate over a network, such as the network 120. For example, implementations can include iPhone-type devices, e.g., as provided by Apple Inc., BlackBerry-type devices, e.g., as provided by BlackBerry Ltd., iPod or iPad-type devices, e.g., as provided by Apple Inc., other portable music or media players, or other communication devices including other handled, portable, or stationary devices for gaming, communications, and/or data organization. The client devices 110(a)-(b) can be the same, or can be devices of different types. The one or more client devices 110(a)-(b) can perform functions unrelated to the education proximity detection system, such as placing personal telephone calls, playing music, playing video, displaying pictures, browsing the Internet, maintaining an electronic calendar, modifying or organizing data, etc.

The client devices 110(a)-(b) can further be equipped to detect the presence of and/or receive information from the wireless sensor beacons 150(a)-(N). For example, the wireless sensor beacons 150(a)-(N) may be Bluetooth Low Energy devices, and the client devices 110(a)-(b) may be capable of detecting signals broadcast by, or receiving the information broadcast by, the wireless sensor beacons 150(a)-(N).

Upon detecting and/or receiving signals from one or more wireless sensor beacons 150(a)-(N), a client device 110(a)-(b) can perform additional operations to provide location-based services using proximity detection technology. For example, the client device 110(a) can receive information broadcast by the wireless sensor beacon 150(a). The client device 110(a) can use this information to identify the wireless sensor beacon 150(a), and can use the strength of the signal received from the wireless sensor beacon 150(a) to estimate the client device's 110(a) proximity to the wireless sensor beacon 150(a). Based on identifying the wireless sensor beacon 150(a) and the proximity of the client device 110(a) to the wireless sensor beacon 150(a), a location of the client devices 110(a) may be estimated. In some implementations, identifying the wireless sensor beacon 150(a) and/or estimating the physical location of the client device 110(a) based on the information broadcast by the wireless sensor beacon 150(a) can be performed by an application hosted by the client device 110(a). In other implementations, the client device 110(a) can exchange communications with another system, such as the location engine 130, to identify the wireless sensor beacon 150(a) and/or to estimate the physical location of the client device 110(a).

Each of the client devices 110(a)-(b) having an application instance for providing location-based services using the proximity detection system may be associated with an identifier that uniquely, and in some implementations anonymously, identifies each of the client devices 110(a)-(b). For example, when the application is installed on a particular client device, the proximity detection system may assign the particular client device, the application instance installed on the client device, or a user of the client device a unique identifier. The location proximity detection system can log information, such as location history information, for the client device using the unique identifier, such that the logged information is essentially anonymous. In other implementations, an identifier assigned by the proximity detection system may be linked to a particular user, a particular client device, a particular user profile (e.g., a social network profile), etc.

In some implementations, in order to reduce power consumption of the client devices 110(a)-110(b) while running the location-based services application, the client devices 110(a)-110(b) are operated in several different modes. For example, a client device can operate in a low-power, region monitoring mode until one or more of the wireless sensor beacons 150(a)-(N) are detected, and can then enter a ranging mode to identify one or more of the wireless sensor beacons 150(a)-(N) for the purposes of estimating a physical location of the client device.

For example, a client device 110(a) having an application for location-based services that utilize proximity detection technology can operate in a low-power, region monitoring mode. This mode may be active at all times that the client device 110(a) is active or powered on, may be active while the application is actively running (e.g., in the "foreground"), or while the application is running but is not active (e.g., in the "background"). In some implementations, while operating in the region monitoring mode, the client device 110(a) can detect the presence of one or more wireless sensor beacons 150(a)-(N). For example, the client device 110(a) may detect the presence of a wireless sensor beacon 150(a)-(N) based on detecting a ping broadcast by a wireless sensor beacon 150(a)-(N), or based on detecting other information transmitted by the wireless sensor beacon 150(a)-(N), e.g., the wireless sensor beacon's 150(a)-(N) identifying information. The client device 110(a) may detect only the presence of the one or more wireless sensor beacons 150(a)-(N) such that the client device 110(a) does not identify a particular wireless sensor beacon 150(a)-(N) or group of wireless sensor beacons 150(a)-(N), but rather only that a wireless sensor beacon is within range. In other implementations, detection of the presence of one or more wireless sensor beacons 150(a)-(N) by the client device 110(a) can involve identifying a group of, or an individual, wireless sensor beacons 150(a)-(N). For example, the client device 110(a) can detect the presence of one or more wireless sensor beacons 150(a)-(N) while in region monitoring mode based on receiving information identifying a group of the wireless sensor beacons 150(a)-(N), such as a UUID or major identifier shared by a subset of the wireless sensor beacons 150(a)-150(N), or based on receiving information identifying a particular wireless sensor beacon 150(a)-(N), such as a particular minor identifier.

In some implementations, a client device can be configured to detect the presence of certain wireless sensor beacons while operating in region monitoring mode. For example, a client device 110(a)-110(b) can be configured to detect the presence of one or more wireless sensor beacons 150(a)-(N) that share the same identifier or that have a particular identifier, such as a particular UUID, major identifier, or minor identifier. As an example, the client device 110(a) may only be configured to detect the presence of wireless sensor beacons 150(a)-(N) that are associated with a particular UUID corresponding to a particular building. In other examples, the client device 110(a) may only be configured to detect the presence of wireless sensor beacons 150(a)-(N) that are associated with a particular region of a building and that are associated with a major identifier associated with that region of the building, or may be configured to only detect the presence of a particular wireless sensor beacon 150(a)-(N) that is associated with a particular minor identifier. Using these techniques, the client device 110(a)-(b) may remain in a low-power state for as much time as possible, only becoming active (i.e., ranging) when necessary. For example, using the region monitoring mode, the client device 110(a) may avoid ranging unless the client device 110(a) is in a region relevant to a user of the client device 110(a), or unless the client device 110(a) is in a location where the location-based services provided by the proximity detection system are available.

Based on detecting the presence of one or more wireless sensor beacons, a client device can transition from the low-power, region monitoring mode to a ranging mode. While in ranging mode, the client device can identify one or more wireless sensor beacons and can additionally obtain other information relevant to providing location-based services, such as by estimating the proximity of the client device to one or more of the identified wireless sensor beacons. For example, the client device 110(a) operating in region monitoring mode may detect the presence of the wireless sensor beacon 150(a) based on receiving data broadcast by the wireless sensor beacon 150(a) that includes a particular UUID associated with the wireless sensor beacon 150(a). In response, the client device 110(a) may enter ranging mode, and may identify one or more wireless sensor beacons 150(a)-(N). Identifying one or more wireless sensor beacons 150(a)-(N) while in ranging mode may involve receiving information identifying each, or a subset of, the wireless sensor beacons 150(a)-(N), for example, the UUID, major identifier, and/or minor identifier of the wireless sensor beacons 150(a)-(N). Additionally, the client device 110(a) may determine the signal strength of the signals received from one or more of the wireless sensor beacons 150(a)-(N). For example, the client device 110(a) may measure the absolute signal strength of the received signals (e.g., in Watts), or may measure the signal strength in other ways (e.g., as a ratio measured in decibel-Watts). In some implementations, each of the wireless sensor beacons 150(a)-(N) may emit signals at a predetermined or known power level, such that a proximity to a particular wireless sensor beacon may be estimated based on the difference between the transmitted signal power and the signal power received at a client device.

While, in most applications, the data transferred between the client devices 110(a)-(b) and the wireless sensor beacons 150(a)-(N) is limited to the exchange of wireless sensor beacon identifier information, in some implementations, other information may be exchanged between the client devices 110(a)-(b) and the wireless sensor beacons 150(a)-(N). For example, information exchanged may include information relating to the battery level of one or more of the wireless sensor beacons 150(a)-(N), error messages, preferences or settings, identifier information, information identifying a client device 110(a)-(b), information identifying a user or user profile associated with one or more client devices 110(a)-(b), or other information.

Based on identifying one or more wireless sensor beacons 150(a)-(N) and, in some implementations, obtaining data used to estimate the proximity to one or more of the wireless sensor beacons 150(a)-(N) (e.g., data indicating the strength of the received signals), the client device 110(a) can perform operations to estimate a location of the client device 110(a) or can determine other operations to perform. For example, the client device 110(a) can estimate its location based on receiving information identifying one or more wireless sensor beacons 150(a)-(N) and based on obtaining information used to determine the proximity of the client device 110(a) to the one or more wireless sensor beacons 150(a)-(N). The client device 110(a) can estimate this location based on accessing information defining a geographical location or classroom associated with one or more of the identified wireless sensor beacons 150(a)-(N) and the information used to determine the proximity to one or more of the wireless sensor beacons 150(a)-(N). This process is described in greater detail with respect to FIG. 2.

The client device 110(a) may determine other operations to perform based on receiving the information identifying one or more wireless sensor beacons 150(a)-(N) or a proximity to one or more of the wireless sensor beacons 150(a)-(N). For example, based on identifying one or more wireless sensor beacons 150(a)-(N) associated with a particular identifier, or based on determining a proximity to one or more particular wireless sensor beacons 150(a)-(N), the client device 110(a)-(b) can access particular information or content. For example, the client device 110(a)-(b) can determine information to provide to a user of the client device 110(a)-(b) based on the user's client device 110(a)-(b) being located near one or more particular wireless sensor beacons 150(a)-(N) or within a threshold proximity of one or more wireless sensor beacons 150(a)-(N). Other information may be accessed or other operations may be performed based on the received wireless sensor beacon information and/or information indicating the proximity to particular wireless sensor beacons. In some implementations, data accessed by a client device may be accessed locally at the client device, or operations performed by a client device may be performed locally at the client device. In other implementations, the client device may access information at a remote location, for example, at the location engine 130, or may cause operations to be performed at a location remote from the client device, for example, at the location engine 130.

When information is accessed or performed remotely from a particular client device 110(a)-(b), information may be exchanged between the client device and the location engine 130 using one or more networks 120. For example, a client device 110(a) can transmit data to the location engine 130 over the network 120 identifying one or more wireless sensor beacons 150(a)-(N) and/or the proximity of the client device 110(a) to one or more of the wireless sensor beacons 150(a)-(N). The location server 130 can receive the information from the client device 110(a), and in response can perform operations on the received information or provide information to the client device 110(a) over the network 120.

The network 120 is configured to enable electronic communications between devices connected to the network 120. For example, the network 120 can be configured to enable the exchange of electronic communications between the client devices 110(a)-(b) and the location engine 130.

The network 120 can include, for example, one or more of the Internet, Wide Area Networks (WANs), Local Area Networks (LANs), e.g., Wi-Fi, analog or digital wired and wireless telephone networks, e.g., a public switched telephone network (PSTN), Integrated Services Digital Network (ISDN), a cellular network, and Digital Subscriber Line (DSL), Ethernet, Internet Protocol (IP) over broadband, radio, television, cable, satellite, or any other delivery or tunneling mechanism for carrying data. Network 120 can include multiple networks or subnetworks, each of which can include, for example, a wired or wireless data pathway. The network 120 can include a circuit-switched network, a packet-switched data network, or any other delivery or tunneling mechanism for carrying data (e.g., data or voice communications). For example, the network 120 can include networks based on the Internet protocol (IP), asynchronous transfer mode (ATM), the PSTN, packet-switched networks based on IP, X.25, or Frame Relay, or other comparable technologies and can support voice using, for example, VoIP, or other comparable protocols used for voice communications. The network 120 can include one or more networks that include wireless data channels and wireless voice channels. The network 120 can be a wireless network, a broadband network, or a combination of networks including a wireless network and a broadband network. In some implementations, the network 120 can include one or more individual networks.

The location engine 130 can include one or more servers and can communicate with the client devices 110(a)-(b) over the network 120. In some implementations, the location engine 130 can be able to access and store information, for example, information received from the client devices 110(a)-(b). Such information may include, for instance, information identifying the one or more client devices 110(a)-(b) (e.g., an identifier for the client devices 110(a)-(b)), estimated locations of the client devices 110(a)-(b), information identifying one or more wireless sensor beacons 150(a)-(N), information relating to the proximity of one or more wireless sensor beacons 150(a)-(N) to one or more client devices 110(a)-(b), information associated with user or device profiles associated with the client devices 110(a)-(b), etc. In some instances, the location engine 130 can access other information that is available at one or more other servers that are in communication with the location engine 130, or information that is otherwise accessible, e.g., over the network 120. Such information may include information or content to provide to the client devices 110(a)-(b), or can include other information. In some implementations, the location engine 130 can receive information from one or more sources and can perform analysis on the received information. For example, the location engine 130 may be able to identify particular content to provide to the client device 110(a) based on receiving information indicating, or otherwise determining, a location of the client device 110(a).

In some implementations, the location engine 130 can also store information relevant to location-based services provided by the proximity detection system. For example, the location engine 130 may receive information from the client device 110(a) that identifies one or more particular wireless sensor beacons 150(a)-(N) and a proximity of the client device 110(a) to the particular wireless sensor beacons 150(a)-(N), and can estimate the physical location (e.g., latitude and longitude) of the client device 110(a) at the particular time when the data was received and/or obtained by the client device 110(a). The location engine 130 can store information tracking the location of the client device 110(a) and/or other client devices 110(a)-(b) over time and can perform additional analysis on the location data, where the results of such analysis may also be stored by the location engine 130.

Figure 2:
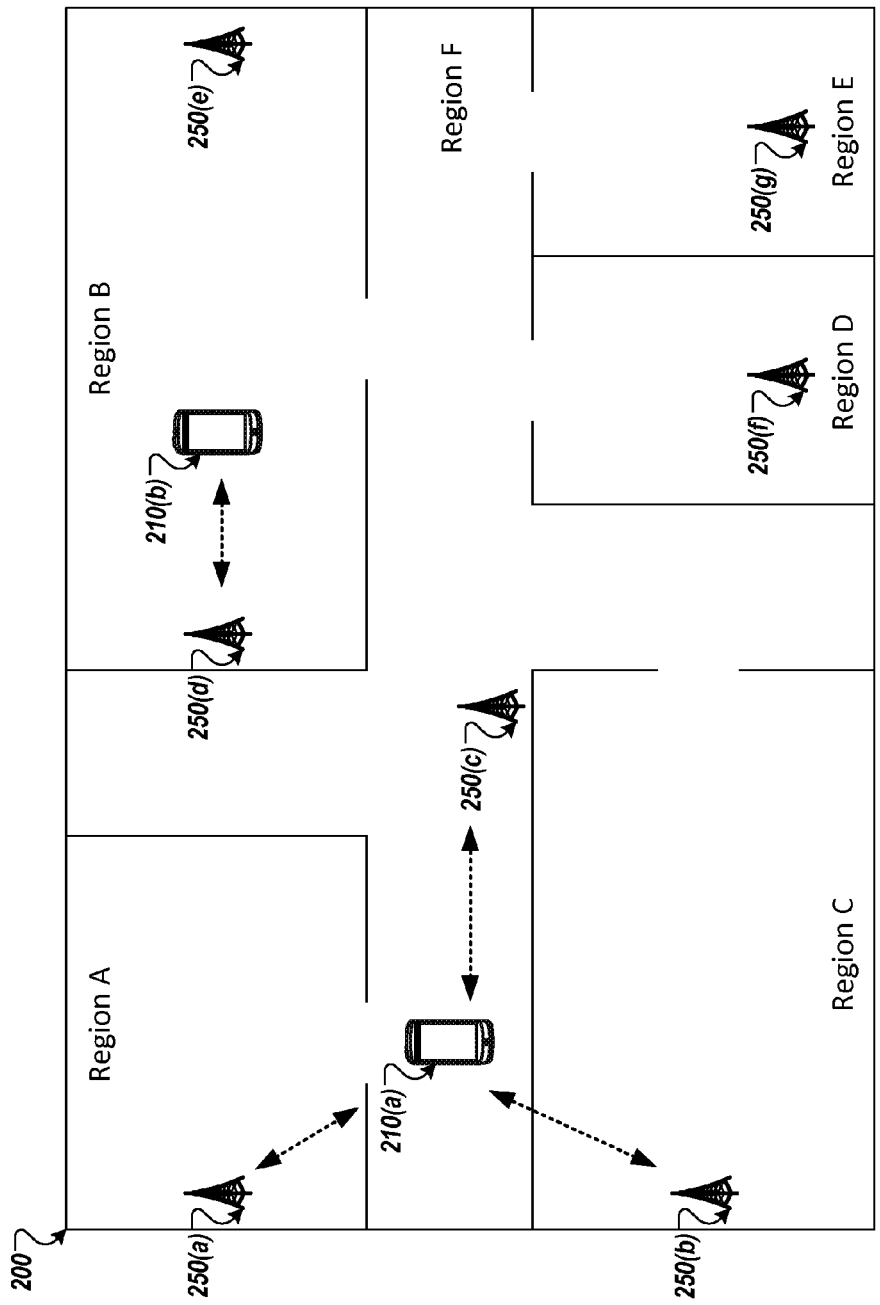
FIG. 2 depicts an example system for using proximity detection technology to determine a physical client device location.

FIG. 2 illustrates an example implementation in which the proximity detection system of FIG. 1 is used to estimate the location of one or more client devices. As shown in FIG. 2, a space 200 can be divided into several regions. For instance, the space 200 is shown divided into regions A through F. The space 200 may be, for example, a building, a particular floor of a building, a venue (e.g., stadium, concert hall, festival, etc.), an outdoor area (e.g., a park, a city, etc.), or any other space. The space 200 can be associated with multiple wireless sensor beacons 250(a)-(g) that are positioned throughout the space 200. The multiple wireless sensor beacons 250(a)-(g) may be associated with identifier information that is shared across multiple wireless sensor beacons 250(a)-(g), such as a UUID or major identifier, and/or may be associated with identifier information that is unique to each of the wireless sensor beacons 250(a)-(g), such as unique minor identifiers.

Based on the space 200 being associated with the wireless sensor beacons 250(a)-(g), a location of the client devices 210(a)-(b) may be estimated. Each of the client devices 210(a)-(b) may host an application for providing location-based services using the proximity detection technology utilized by the proximity detection system. At a particular point in time, the client devices 210(a)-(b) may be running the application actively (in the "foreground"), in standby (in the "background"), or may not be running the application at all. The client devices 210(a)-(b) may further be operating in the low-power, region monitoring mode. While operating in this mode, the client devices 210(a)-(b) may detect the presence of one or more of the wireless sensor beacons 250(a)-(g). In some implementations, as described, the client devices 210(a)-(b) may detect the presence of any wireless sensor beacon regardless of it associated UUID, major identifier, or minor identifier. In other implementations, the client devices 210(a)-(b) may detect the presence only of particular wireless sensor beacons 250(a)-(g) that are associated with particular UUIDs, major identifiers, and/or minor identifiers. Based on detecting the presence of one or more wireless sensor beacons 250(a)-(g), the client devices 210(a)-(b) may enter ranging mode to identify one or more wireless sensor beacons 250(a)-(g) that are in range of the client devices 210(a)-(b).

While the client devices 210(a)-(b) are in ranging mode, information received and/or obtained by the client devices 210(a)-(b) can include information identifying particular wireless sensor beacons 250(a)-(g) (e.g., the UUID, major identifier, and minor identifier of each wireless sensor beacon 250(a)-(g) that is within range). The information received and/or obtained by a particular client device 210(a)-(b) may further include information indicating, or that can be used to determine, the proximity of the particular client device 210(a)-(b) to particular wireless sensor beacons 250(a)-(g). For example, a client device 210(a) can obtain information indicating a strength of signal received from a particular wireless sensor beacon 250(a), and can use the signal strength information to determine the proximity of the client device 210(a) to the particular wireless sensor beacon 250(a). Alternatively, the client device 210(a) can receive information indicating the proximity of the client device 210(a) to the particular wireless sensor beacon 250(a). In such an implementation, the client device 210(a) may receive information indicating its proximity to the wireless sensor beacon 250(a) based on providing the location engine 130 information indicating the strength of a signal received from the wireless sensor beacon 250(a), where the location engine 130 can calculate the proximity of the wireless sensor beacon 250(a) to the client device 210(a) and provide information to the client device 210(a) indicating the client device's 210(a) proximity to the wireless sensor beacon 250(a). In some implementations, the wireless sensor beacons 250(a)-(g) can be calibrated to ensure that the determined proximity to a particular wireless sensor beacon is accurate.

Based on the information identifying the wireless sensor beacons 250(a)-(g) and the proximity of the wireless sensor beacons 250(a)-(g) to a particular client device 210(a)-(b), the location of a particular client device 210(a)-(b) can be estimated. In some implementations, the location of a client device can be estimated based on determining the closest wireless sensor beacon to the client device. In other implementations, the location of a client device can be estimated by using trilateration or by other methods that can provide estimates of locations based on an object's proximity to one or more other objects.

As an example, the location of the client device 210(b) may be estimated based on determining the closest wireless sensor beacon 250(a)-250(g) to the client device 210(b). Upon detecting the presence of one or more wireless sensor beacons 250(a)-(g), that is, upon entering ranging mode, the client device 210(b) may identify and determine a proximity to one or more of the wireless sensor beacons 250(a)-(g). The client device 210(b) may then identify a particular wireless sensor beacon 250(d) to which it is the closest from among the wireless sensor beacons 250(a)-(g), for example, based on determining that the strength of the signal received from the wireless sensor beacon 250(d) is the strongest among the signals received by the wireless sensor beacons 250(a)-(g) that have been identified by the client device 210(b). The client device 210(b) may then estimate its proximity to the wireless sensor beacon 250(d) based on the received signal strength. In some implementations, estimating the location of the client device 210(b) can involve determining the proximity of the client device 210(b) to the wireless sensor beacon 250(d) multiple times (e.g., periodically), and using an average or running average of the multiple proximity measurements as the proximity of the client device 210(*b*) to the wireless sensor beacon 250(*d*). By averaging multiple proximity measurements, the proximity detection system can reduce the effects of interference or transient events that could influence the proximity measurements (e.g., a user opening or closing a door).

Based on determining the proximity of the client device 210(*b*) to the wireless sensor beacon 250(*d*), a geographical location or region associated with the closest wireless sensor beacon 250(*d*) can then be determined. For example, the client device 210(*b*) may store information that identifies the geographical location or region associated with each wireless sensor beacon 250(*a*)-(*g*), identified by their identifiers, and may access the information to determine the geographical location or region associated with the wireless sensor beacon 250(*d*). In other implementations, such information mapping the geographical locations or regions associated with the wireless sensor beacons 250(*a*)-(*g*) to the identifiers associated with those wireless sensor beacons 250(*a*)-(*g*) may be accessible by the client device 210(*b*) elsewhere, for example, at the location engine 130. Based on determining the most proximate wireless sensor beacon 250(*d*), the client device 210(*b*) (or alternatively the location engine 130) can estimate the location of the client device 210(*b*). For instance, the estimated location of the client device 210(*b*) may be a location that corresponds to the determined proximity from the wireless sensor beacon 250(*d*) in which the client device 210(*b*) could conceivably be located (e.g., not within a wall of a building). The client device 210(*b*) and/or the location engine 130 may then document the estimated location of the client device 210(*b*) at that particular point in time. For example, the client device 210(*b*) can locally store information logging the estimated location and the particular time, or can transmit information indicating the estimated location and the particular time to the location engine 130 for storage.

In another implementation, trilateration may be used to estimate the location of a client device, for example, the client device 210(*a*). Such a process enables the estimation of the absolute or relative location of the client device 210(*a*) based on the proximity of the client device 210(*a*) to three wireless sensor beacons of the wireless sensor beacons 250(*a*)-(*g*). In other implementations, a multilateration process may be used to estimate the location of a client device, where the multilateration process utilizes any number of two or more wireless sensor beacons to determine an approximate location of a client device. In some instances, the wireless sensor beacons selected to perform the trilateration or multilateration process can be those that are determined to be the closest to the client device 210(*a*), or the wireless sensor beacons selected to perform the trilateration process may be selected in a different way (e.g., the selected wireless sensor beacons may be preferred wireless sensor beacons). In some instances, selection of the wireless sensor beacons used to perform trilateration can be based on a previously estimated location of a client device. For example, based on determining that the client device 210(*a*) was previously located in region A of the space 200, the proximity detection system may select the wireless sensor beacons 250(*a*), 250(*b*), and 250(*c*) to perform trilateration. These wireless sensor beacons may be selected regardless of the detected signal strengths of the wireless sensor beacons. For example, even if the client device 210(*a*) determines that it received a stronger signal from the wireless sensor beacon 250(*d*) than it did from the wireless sensor beacon 250(*b*), the wireless sensor beacon 250(*b*) may be selected since it is closer to a previously estimated location of the client device 210(*a*). Additionally, in some instances, selection of the wireless sensor beacons used to perform the trilateration or other multilateration process is based on determining that certain geometries are preferable for determining the approximate location of a client device, for example, based on the detected angles between wireless sensor beacons and a client device.

In the example shown in FIG. 2 which uses a trilateration process to estimate a location of a client device, upon detecting the presence of one or more wireless sensor beacons 250(*a*)-(*g*), that is, upon entering ranging mode, the client device 210(*a*) may identify and determine a proximity to one or more of the wireless sensor beacons 250(*a*)-(*g*). The client device 210(*a*) may then select three of the identified wireless sensor beacons 250(*a*)-(*g*). For example, client device 210(*a*) may select the wireless sensor beacons 250(*a*), 250(*b*), and 250(*c*) that are determined to be the closest to the client device 210(*a*), based on detecting the proximity of the client device 210(*a*) to each of the wireless sensor beacons 250(*a*)-(*g*).

In other implementations, wireless sensor beacons 250(*a*)-(*g*) can be selected based on factors in addition to or in lieu of their proximity to the client device 210(*a*). For example, the proximity detection system may select a particular wireless sensor beacon based on the particular wireless sensor beacon being a preferred wireless sensor beacon or a wireless sensor beacon whose signal is not affected by obstacles or materials that the signal must travel through, e.g., walls. In some implementations, wireless sensor beacons may be selected based on the geometry formed by the wireless sensor beacons and a client device. For example, in performing trilateration, it is preferred that the angles formed by the wireless sensor beacons and the client device (e.g., with the client device forming the vertex of the angle) are acute angles or right angles. Thus, the selection of wireless sensor beacons may be based at least in part on determining wireless sensor beacons that form acute or right angles with the client device, such that wireless sensor beacons that form obtuse angles with the client device are not selected. In some implementations, the selection of wireless sensor beacons may consider multiple factors. For example, a particular wireless sensor beacon may be selected based on a combination of the detected signal strength of the wireless sensor beacon, the estimated proximity of the wireless sensor beacon to a client device, and the geometries (e.g., angles) formed between the particular wireless sensor beacon, the client device, and other wireless sensor beacons.

In some implementations, selecting wireless sensor beacons used to estimate the location of a client device may be dependent on determining that the signals received from one or more wireless sensor beacons satisfy a signal strength threshold. For example, a client device can determine the strength of the signals received from one or more wireless sensor beacons and can compare the detected signal strength to a signal strength threshold. If none of the detected signals meet the signal strength threshold, the proximity detection system may determine that a client device's location cannot be estimated, or may estimate the client device's location based on previous location estimates. For example, a location of a client device may be estimated based on a previous location estimate of the client device, an estimated speed and direction of movement of the client device, and/or historical movement data of the client device. If less than three of the identified wireless sensor beacons have detected signal strengths meeting the signal strength threshold, the proximity detection system may estimate the location of the client device based on the proximity of the client device to one (or both) of the wireless sensor beacons that have a received signal strength satisfying the threshold. This estimation may also be supplemented or adjusted based on previous estimates of the location of the client device, an estimated velocity or direction of movement for the client device, etc. If three or more of the identified wireless sensor beacons are determined to have received signal strengths satisfying the signal strength threshold, then wireless sensor beacons may be selected for estimation of the client device's location using trilateration. The selected wireless sensor beacons may be the wireless sensor beacons having the strongest received signal strength. In some implementations, the selection of wireless signal beacons to use in trilateration is dependent on the difference in the received signal strengths. For example, if the difference between the third strongest received signal and the fourth strongest or other received signal is above a certain threshold amount, then the three wireless sensor beacons with the strongest signals are selected for trilateration. If the difference in signal strength between the third strongest received signal and the fourth strongest or other received signal does not satisfy the threshold amount, then the wireless sensor beacons selected for trilateration may be a different set of wireless sensor beacons. For example, the wireless sensor beacons selected for trilateration can be selected from among the set of all wireless sensor beacons with received signal strengths that satisfy the signal strength threshold. The selection of the wireless sensor beacons may be determined based on geometric considerations (e.g., based on the angles formed between the wireless sensor beacons and the client device), based on a previously estimated location of the client device (e.g., based on determining which of the wireless sensor beacons are likely the closest to the client device), based on the relative signal strengths of the wireless sensor beacons, based on angles that would result in the trilateration calculation, or based on other factors. After selecting the wireless sensor beacons for trilateration, the proximity detection system can estimate the location of the client device using trilateration, and may also supplement and/or confirm the estimation of the client device's location with other information, for example, previously estimated locations, directions of movement, or rates of movement of the client device. In some implementations, the location estimate determined using any of the above methods may be further supplemented to confirm or adjust the location estimate, for example, by confirming that it is possible for the client device to be located in the estimated location.

Once the wireless sensor beacons 250(a), 250(b), and 250(c) have been selected and the identities and proximities of the selected wireless sensor beacons 250(a), 250(b), and 250(c) to the client device 210(a) have been determined, the location of the client device 210(a) may be estimated. For example, the geographical locations or regions associated with each of the wireless sensor beacons 250(a), 250(b), and 250(c) can be determined using techniques previously described, such as by accessing a lookup table mapping wireless sensor beacon identifier information to physical locations. A position of the client device 210(a) relative to the wireless sensor beacons 250(a), 250(b), and 250(c) can be estimated using trilateration. Based on the information indicating the physical locations or regions associated with the wireless sensor beacons 250(a), 250(b), and 250(c) and the position of the client device 210(a) relative to the wireless sensor beacons 250(a), 250(b), and 250(c), an estimate of the physical location of the client device 210(a) can be determined. The client device 210(a) and/or the location engine 130 may then document the estimated location of the client device 210(a) at that particular point in time.

In some implementations, estimating a physical location of a client device can utilize multiple estimates of the client device's physical location. For example, the proximity detection system may estimate the location of a client device by using both a multilateration process and by estimating the location based on the proximity of the client device to the nearest wireless sensor beacon to the client device. The proximity detection system may estimate the location of the client device based on the combination of these two estimates, for example, by averaging the two estimated locations. Determining the estimated location of a client device based on two or more estimates may consider other factors as well, for example, the estimated location of a client device may be based on averaging the multiple location estimates for the client device (e.g., taking the average of an estimated location determined by using a multilateration process and an estimated location determined using the closest wireless sensor beacon to the client device) and "snapping" that estimated location to a location where the client device could potentially be located. For example, if the average of two estimated locations for the client device is within a wall of a building, the proximity detection system can "snap" the location of the client device to a hallway next to the wall.

In some implementations, determining the proximity of a client device to a wireless sensor beacon can involve determining an estimated proximate distance of one to the other. For example, the client device 210(a) may determine that it is approximately 5 meters from the wireless sensor beacon 250(a). Such estimates may be dependent upon absorption of the signals broadcast by the wireless sensor beacons by other materials, such as the materials forming walls in a building. As a result of this phenomenon, it is possible that a wireless sensor beacon may be estimated as being further away from a client device than it actually is, since the signal received by the client device is weaker than it would typically be if not affected by its passing through other media, e.g., walls. In other implementations, determining the proximity of a client device to a wireless sensor beacon can involve classifying the client device as being immediate, e.g., from 0 to 3 meters, near, e.g., from 3 to 6 meters, or far, e.g., greater than 6 meters, from the wireless sensor beacon.

Additionally, as described, an application associated with a particular client device and/or the location engine 130 may maintain information that identifies locations within a space that a client device may be located. In such implementations, if an estimated location of a client device is determined to be a location in which the client device may not be located, the estimated location of the client device may be adjusted (e.g., "snapped") such that the estimated location is a permissible location. For example, the client device 210(a) and/or the location engine 130 may maintain a map of the space 200 of FIG. 2. If the estimated location of the client device 210(a) is determined to be within a wall of the space 200, such that the estimated location is not a possible location for the client device 210(a) to be located, the estimated location of the client device 210(a) may be "snapped to" or otherwise adjusted to a permissible location, e.g., the closest permissible location to the initially estimated location.

In some implementations, the wireless sensor beacons 250(a)-(g) may be reconfigurable, such that the proximity detection system can reconfigure the wireless sensor beacons 250(a)-(g) of the space 200. For example, if the proximity detection system determines that a particular wireless sensor beacon is not currently being used or is not used during specific hours of the day (e.g., that client devices do not identify the wireless sensor beacon during those hours), the proximity detection system may turn off the particular wireless sensor beacon or may turn off the wireless sensor beacon during the hours when the wireless sensor beacon is not used. In other examples, the proximity detection system may be able to monitor the accuracy and/or usefulness of a particular beacon. For example, if the proximity detection system determines that a particular wireless sensor beacon does not provide accurate location estimations, the proximity detection system can flag the wireless sensor beacon as needing to be moved or replaced. In other examples, the proximity detection system can determine that a particular wireless sensor beacon is largely redundant (e.g., is not necessary to providing accurate location estimates), and therefore may be better utilized by repositioning the wireless sensor beacon to a different area of a space, or that the wireless sensor beacon can be removed from the space. Reconfiguring the wireless sensor beacons within a space may allow for more accurate location estimating and/or more efficient use of resources including power usage and the deployment of available wireless sensor beacons.

Based on determining and tracking the estimated locations of one or more client devices within a particular space, various information can be determined about the space, the presence and distribution of users within the space, the movement of users throughout the space, and other spatial and/or temporal factors relating to the use of the space by one or more users.

Figure 3:
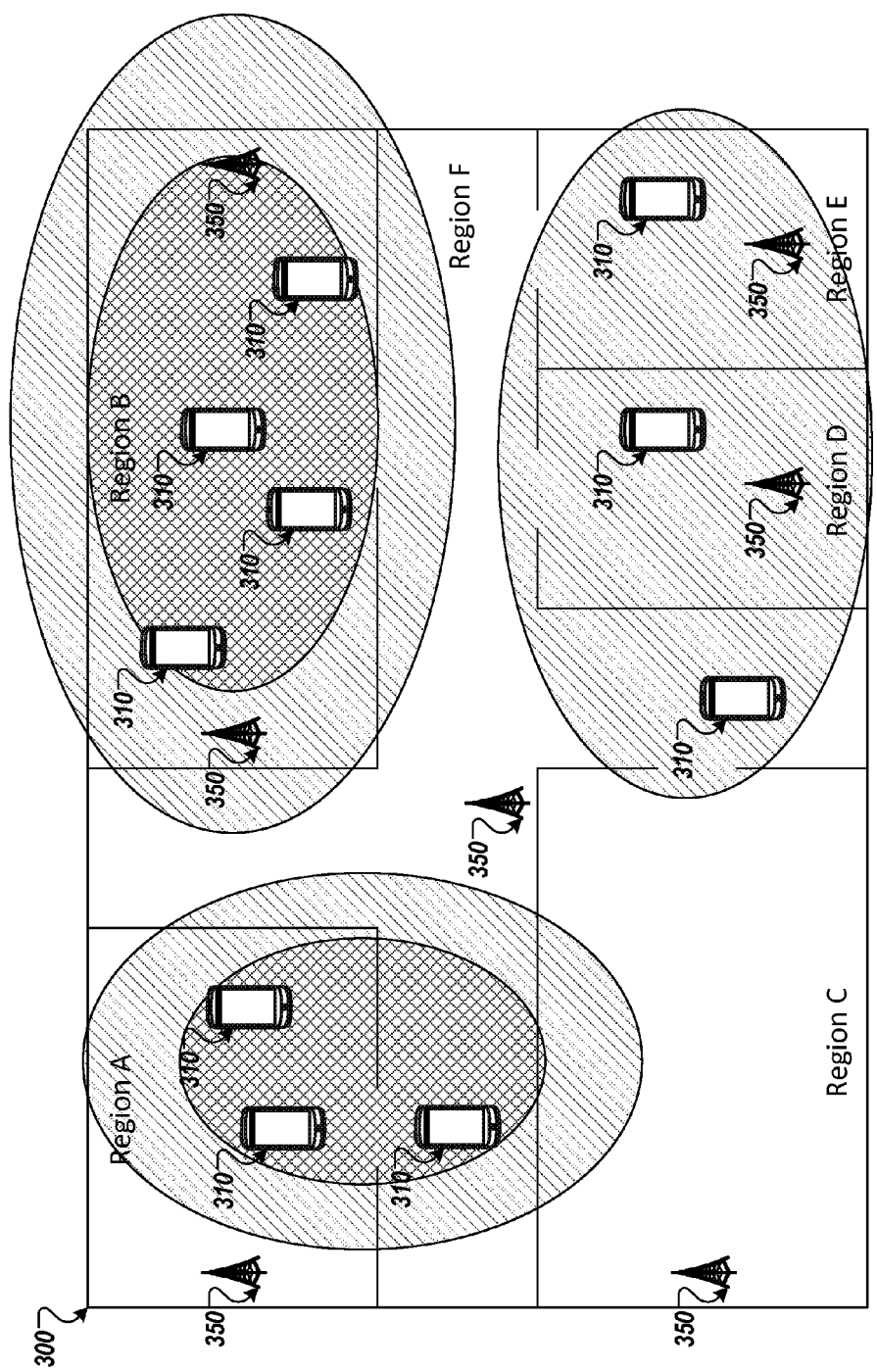
FIG. 3 depicts an example system for using proximity detection technology to determine client device population density.

FIG. 3 illustrates an example use of the estimated locations of one or more client devices, in which the estimated locations of multiple client devices is used to generate an occupation density map for the space. As shown in FIG. 3, the space 300 includes multiple wireless sensor beacons 350 that are positioned about the various regions A through F of the space 300. The space 300 is being occupied by multiple users each associated with a client device 310.

Using the described methods, the proximity detection system can estimate the locations of each of the client devices 310. Information identifying the estimated locations of each of the client devices 310 can be aggregated. For example, each of the client devices 310 can estimate their locations within the space 300 and can provide information to the location engine 130 identifying the estimated locations. In other implementations, each of the client devices 310 can transmit data to the location engine 130 identifying one or more wireless sensor beacons 350 and the proximity of a particular client device 310 to one or more of the wireless sensor beacons 350, and the location engine 130 can estimate the physical location of each of the client devices 310. Regardless of where the location estimation of each client devices 310 is performed, the information identifying the locations of the client devices 310 can be aggregated and analysis of the locations of the client devices 310 performed to determine the density of the client devices 310 in different areas or regions of the space 300. The location engine 130, one or more of the client devices 310, and or another system may then be able to access the aggregated location data for the space 300 to generate a graphic, such as that shown in FIG. 3, which illustrates the positions and density of the client devices 310 within the space 300.

In some instances, the density of client devices 310 within the space 300 may be determined by regions of the space 300. For example, the proximity detection system may determine the density of client devices 310 in each of regions A, B, C, D, E, and F separately. This density information may be presented graphically in a similar fashion as that shown in FIG. 3, and may further include presenting the estimated locations of one or more of the multiple client devices 310.

Figure 4:
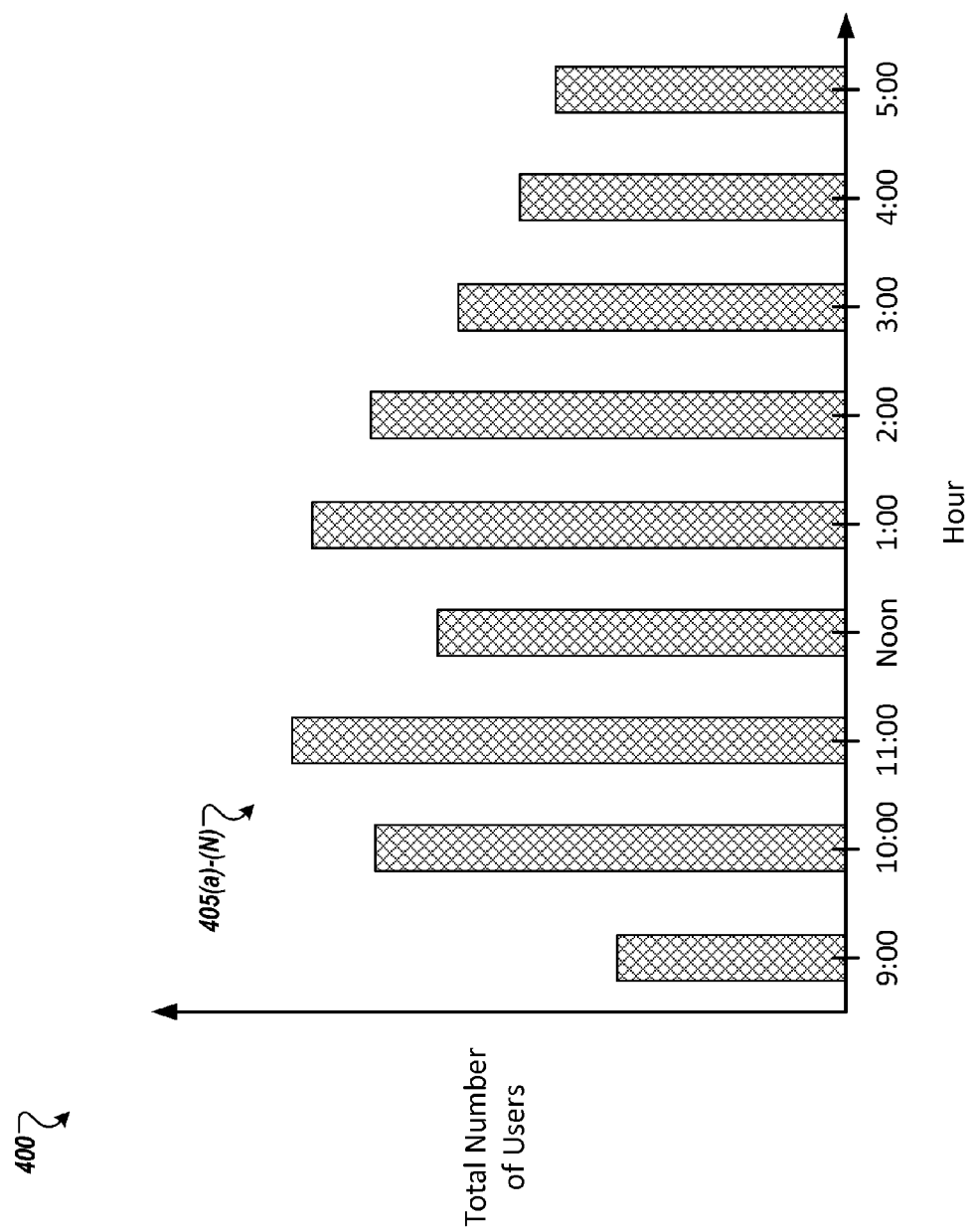
FIGS. 4-6 illustrate example analyses of data collected using proximity detection technology.

FIG. 4 illustrates a graphic in which the proximity detection system has tracked the presence of client devices within a space, or region of a space, over a period of time. For example, the graphic 400 may be a bar graph as shown, in which the graphic 400 describes the total number of unique client devices 310 present within the space 300 of FIG. 3 at various points in time.

Location information obtained from one or more client devices such as the client devices 310 may be received and/or determined for one or more points in time or time periods. For example, the location engine 130 may receive information from the client devices 310 of FIG. 3 that indicate the estimated locations of the client devices 310 at a particular point in time, e.g., at noon. The location engine 130 may determine the total number of client devices 310 present in the space 300 at the particular point in time, and may store information indicating the total number of client devices 310 present in the space 300 at the particular point in time. The location engine 130 may also receive and/or determine the total number of client devices present in the space 300 at other times, such as the number of client devices 310 in the space 300 at 9:00 AM, 10:00 AM, etc. In some implementations, the specific client devices detected as being located within the space 300 may change over time, for example, as users of the client devices 310 enter and exit the space 300. The location engine 130 can calculate the total number of client devices present in the space 300 for each of the selected time points, and can plot the total number of client devices present in the space 300 for each of the selected time points. The location engine 130 can plot the total number of client devices present in the space 300 over time using data points or graph bars 405(a)-(N) as shown in the graphic 400 of FIG. 4.

In some implementations, determining the total number of client devices present in a space can involve determining the total number of unique client devices that have been detected within the space for a predefined period, for example, the number of unique client devices 310 that have been detected in the space 300 from the time period extending from 11:00 AM to noon. Determining the total number of client devices present in the space during the time period may involve counting each client device only once during the time period, for example, such that any client device that was within the space during that period is counted, regardless of when the client device entered and/or exited the space during the time period, while also avoiding the counting of a particular client device within the space more than once for the time period.

Additionally, in some implementations, the graphic 400 may present information indicating the number of client devices located with a particular region of a property over time. For example, the graphic 400 may display the presence of client devices within region A of the space 300 over time. Additionally, while implementations described herein utilize the location engine 130 to perform the analysis required to produce the graphic of FIG. 4, in practice, other components of the proximity detection system may be utilized for such analysis. For example, a particular client device may receive information identifying the client devices present in a space or region of a space, and may compute the total number of client devices present in the space or in a region of the space at each of one or more time points or time periods. The client device may generate the graphic of FIG. 4 based on this analysis.

Figure 5:
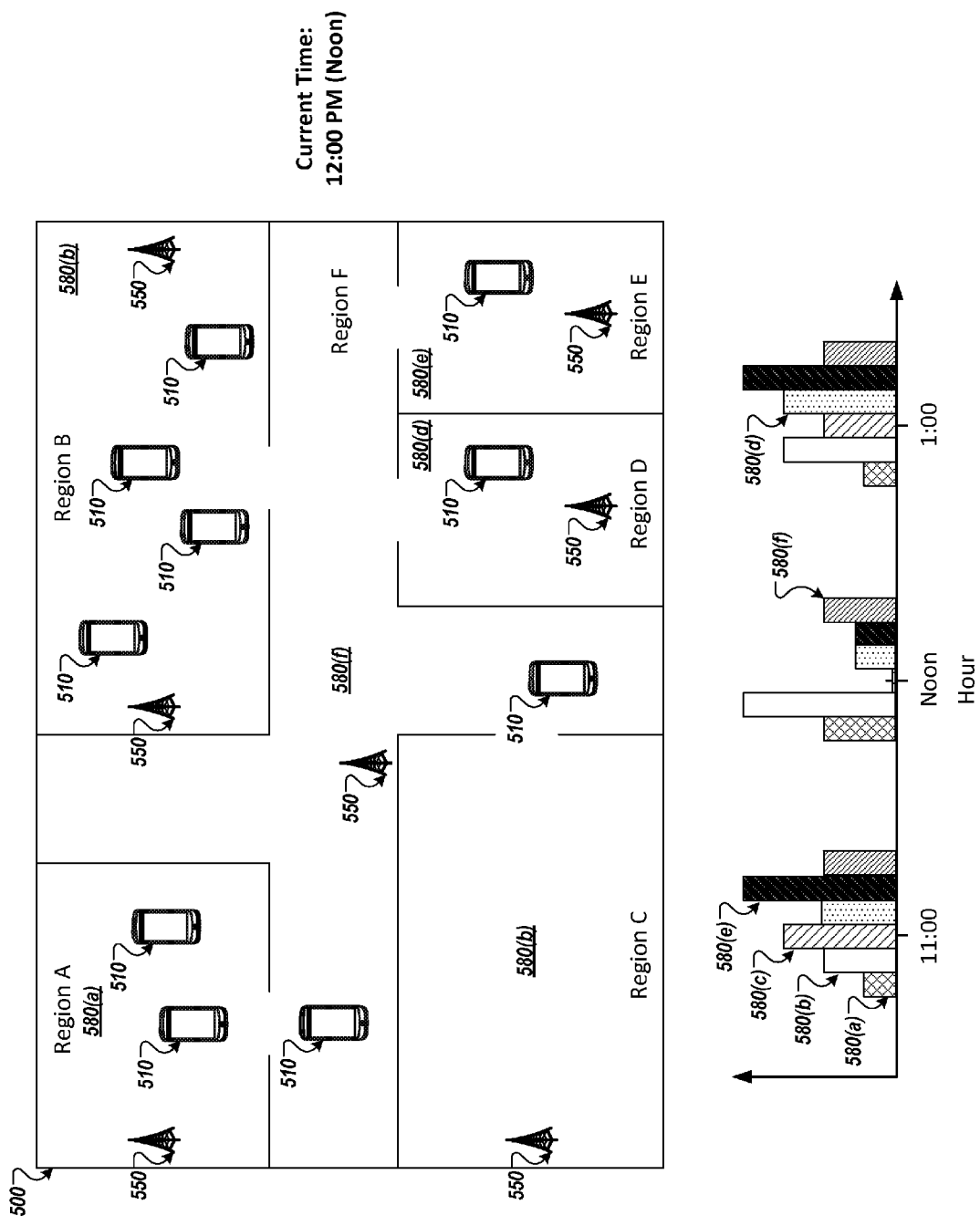

FIG. 5 illustrates another graphic that may be provided in association with the tracking of client devices 510 present within various regions 580(a)-(f) of the space 500. For example, the location engine 130 may receive information indicating the estimated locations of one or more client devices 510 at a particular point in time, for example, noon. Based on the estimated locations of the client devices 510, the location engine 130 may determine the number of client devices 510 present in one or more regions 580(a)-(f) of the space 500 at a particular time. The location engine 130 may then be able to produce a graphic that shows the estimated locations of the client devices 510 within the space 500 at the particular time. The location engine 130 may further be able to plot the number of client devices 510 within each region 580(a)-(f) of the space 500 over time. For example, FIG. 5 displays the estimated locations of client devices 510 within the space 500 at noon, and also displays a plot, shown in FIG. 5 as a bar graph, indicating the number of client devices 510 present in each region 580(a)-(f) of the space 500 at noon. As shown in FIG. 5, for example, the plot reflects that at noon there are two client devices 510 with estimated locations in region A, 4 client devices 510 with estimated locations in region B, zero client devices 510 with estimated locations in region C, one client device 510 with an estimated location in each of regions D and E, and two client devices 510 with estimated locations in region F. As described with respect to FIG. 4, the graphics shown in FIG. 5 may reflect the presence of client devices within regions of a space at a particular time, e.g., at noon, or within a particular range of time, e.g., 11:00 AM to noon.

Additionally, the location engine 130 may be capable of tracking the presence of client devices 510 within the regions 580(a)-(f) of the space 500 over time, such that the number of client devices 510 within each region 580(a)-(f) may be tracked over time. For example, FIG. 5 shows the populations in each of the regions 580(a)-(f) for the times 11:00 AM, noon, and 1:00 PM. While described herein as being performed by the location engine 130, in other implementations, other components of the proximity detection system (e.g., the client devices 510) may be capable of tracking and analyzing the estimated locations of one or more client devices 510 within the space 500 or regions of the space 500.

Figure 6:
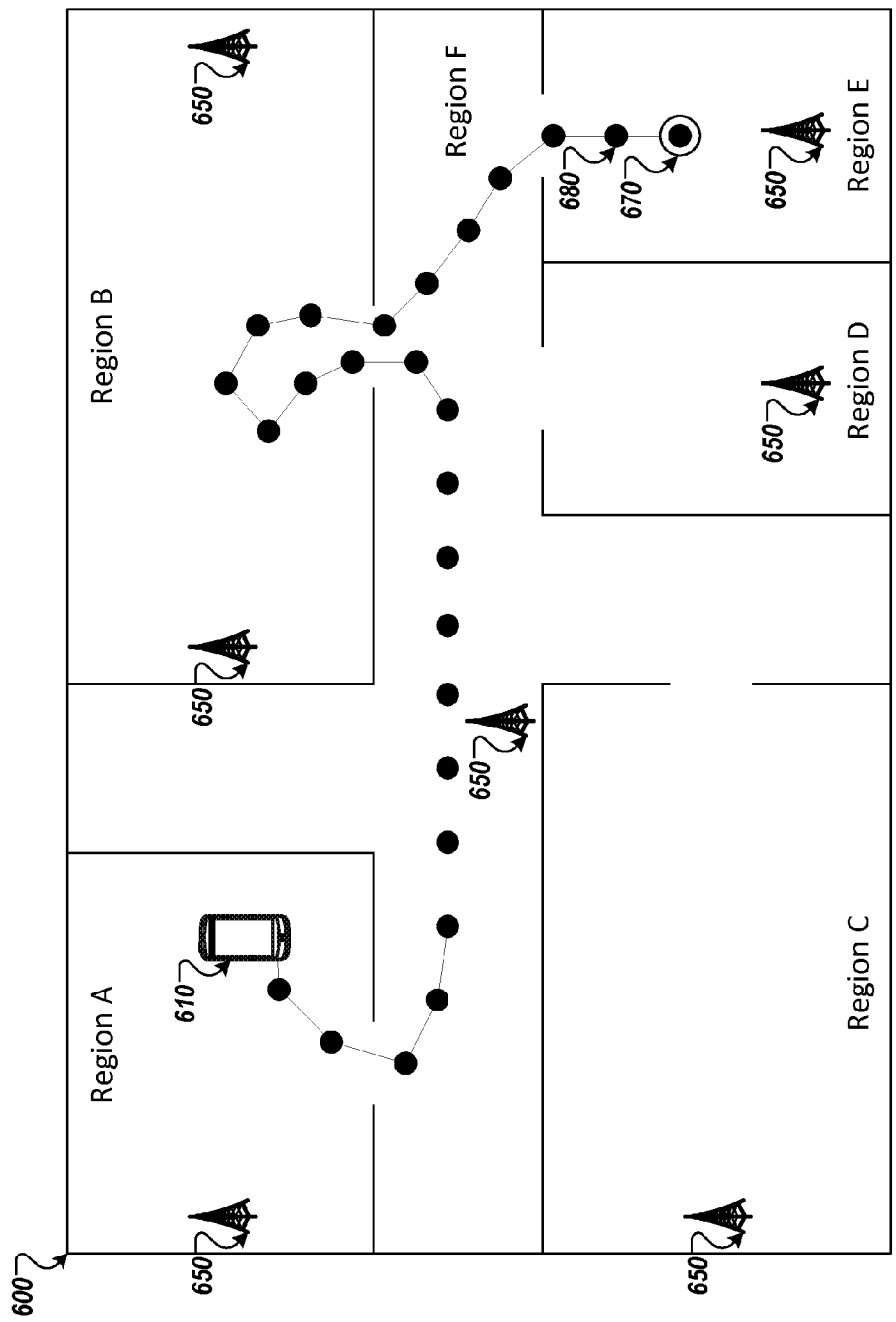

FIG. 6 illustrates an implementation of the proximity detection system that enables the tracking of a particular client device within a space over time. For example, the location of a client device 610 can be estimated at various time points, and a path of the client device 610 can be determined based on the locations of the client device 610 at the various time points.

Specifically, the proximity detection system can identify an initial estimated location of a client device 610, indicated by the point 670 of FIG. 6. This point can correspond, for example, to a time when the client device 610 first detected the presence of one or more wireless sensor beacons 650 and entered ranging mode to determine an estimated location of the client device 610. The proximity detection system can then identify subsequent estimated locations of the client device 610 that are each associated with a particular time. The estimated locations of the client device 610 can be mapped based on the estimated locations of the client device 610 at each time, or a subset of the times. In some implementations, a direction (e.g., a compass heading) and/or a rate of movement of the client device 610 can be determined based on the estimated locations of the client device 610 at each time. The aggregation of the estimated location data pertaining to the client device 610 and/or the plotting of the movement of the client device 610 as shown in FIG. 6 may be performed by the location engine 130 or by another component of the proximity detection system, for example, by the client device 610. Information used to generate the plot of the movement of the client device 610 may further be combined with information used to plot the movement of other client devices, to generate a mapping showing the movement of different client devices through the space 600 over time.

Additionally, in some implementations, the proximity detection system can maintain a mapping of the space 600, for example, a floor plan of the space 600 that identifies multiple regions A through F. In such implementations, tracking the movement of a client device 610 may involve confining the movements of the client device 610 to acceptable paths. For example, the proximity detection system 610 may prohibit a path of the client device 610 that travels through walls of the space 600 (e.g., where the proximity detection system has a map of the space 600 that defines the locations of walls in the space 600). If a detected path of the client device 610 does not match an acceptable path through the space 600, the proximity detection system may "snap" the path of the client device 610 to an acceptable path. Additionally or alternatively, the proximity detection system may maintain a history of paths of client devices through the space 600, and may determine the acceptable or expected paths of a client device 610 through the space 600 based on the history of paths taken by other client devices through the space 600.

Figure 7:
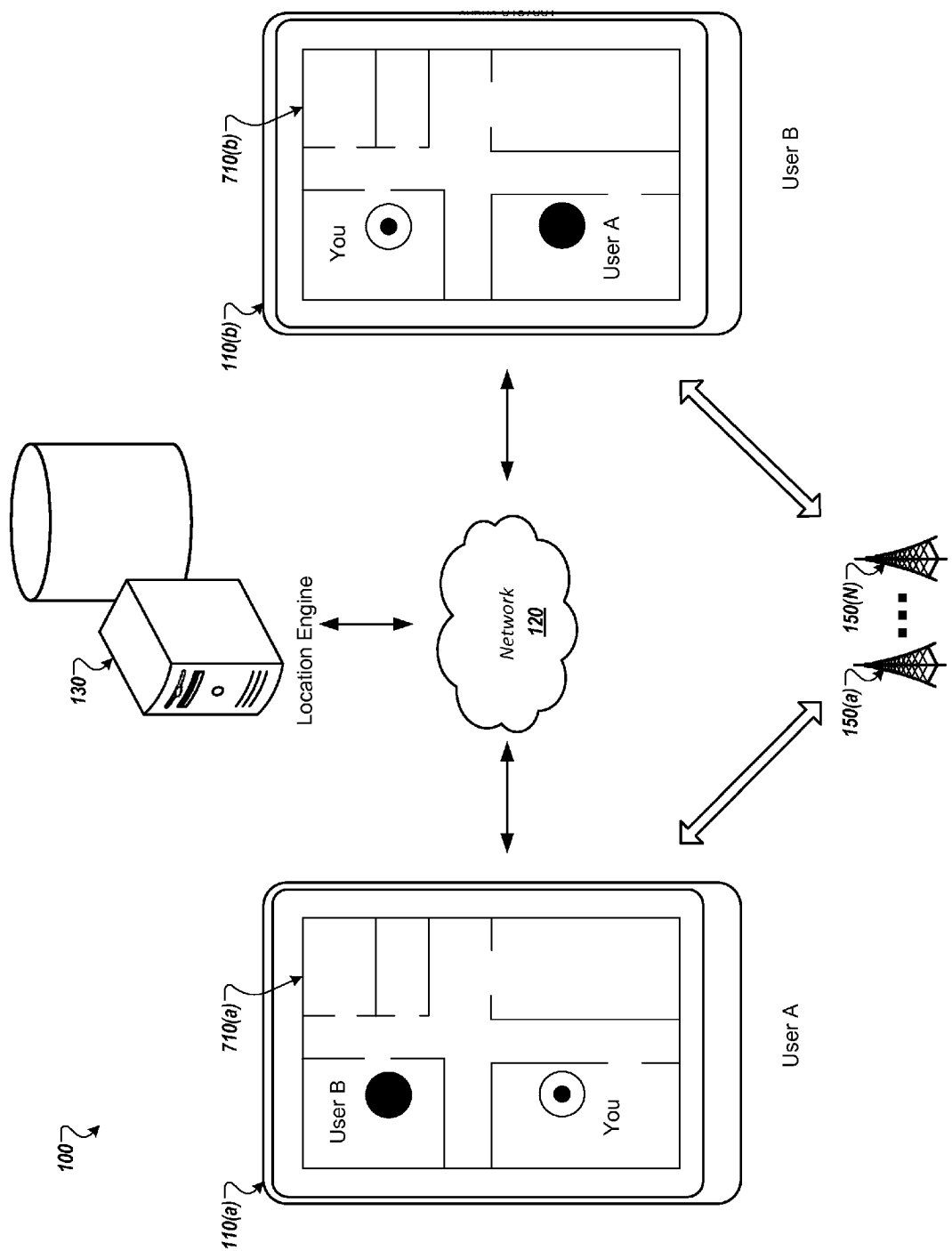
FIG. 7 depicts a system for interactions between multiple client devices based on proximity detection technology.

As described, in implementations in which two or more client devices are located within the same space or region, or are otherwise in communication with the proximity detection system (e.g., in communication with the location server 130), information relating to one client device or a user of the client device may be provided to another client device. FIG. 7 shows an example of such an application.

For example, information may be provided to a client device 110(a) associated with user A that relates to another client device 110(b) associated with a user B, or that relates to the user B. Information associated with a particular client device that is provided to other client devices can include information specifying the estimated location of the particular client device and/or a history of estimated locations of the particular client device. The information may further include information identifying the particular client device. For example, the information may include an identifier used specifically by the proximity detection system to uniquely, and, in some implementations, anonymously, identify any of the particular client device 110(a)-110(b), an instance of an application hosted on the particular client device 110(a)-(b), a user associated with the particular client device 110(a)-(b), a user profile associated with the particular client device 110(a)-(b), etc. Other information associated with a client device, a user of the client device, or a user profile associated with the client device, may be provided to other client devices. For example, information identifying a specific characteristic of other users may be provided to the other client device. Such characteristics may include, for example, an age of a user, a gender of a user, an expertise of the user, a user's contact information or information identifying a profile (e.g., a social network profile) of the user, information associated with the profile of the user (e.g., the user's calendar, affiliations, etc.), or other information.

The communication of information between the client devices 110(a)-(b) of FIG. 7 can be achieved via the network 120 and the location engine 130. For example, the client devices 110(a)-(b) can each be in communication with the location engine 130 over the network 120. Each client device 110(a)-(b), upon detecting and identifying the wireless sensor beacons 150(a)-(N), can notify the location engine 130 of its detection of the wireless sensor beacons 150(a)-(N), and/or may report an estimated location of the client device 110(a)-(b) to the location engine 130. The location engine 130 can determine that the client devices 110(a)-(b) are in the same space, for example, by determining that the client devices 110(a)-(b) are in a similar location or have identified wireless sensor beacons 150(a)-(N) having the same UUID or major identifier. Based on this determination, the location engine 130 can identify relevant information to provide to each of the client devices 110(a)-(b). Such information may include information relating to other client devices 110(a)-(b) and/or may include other information, such as particular content or information determined to be relevant to the estimated locations of the one or more client devices 110(a)-(b).

Figure 8:
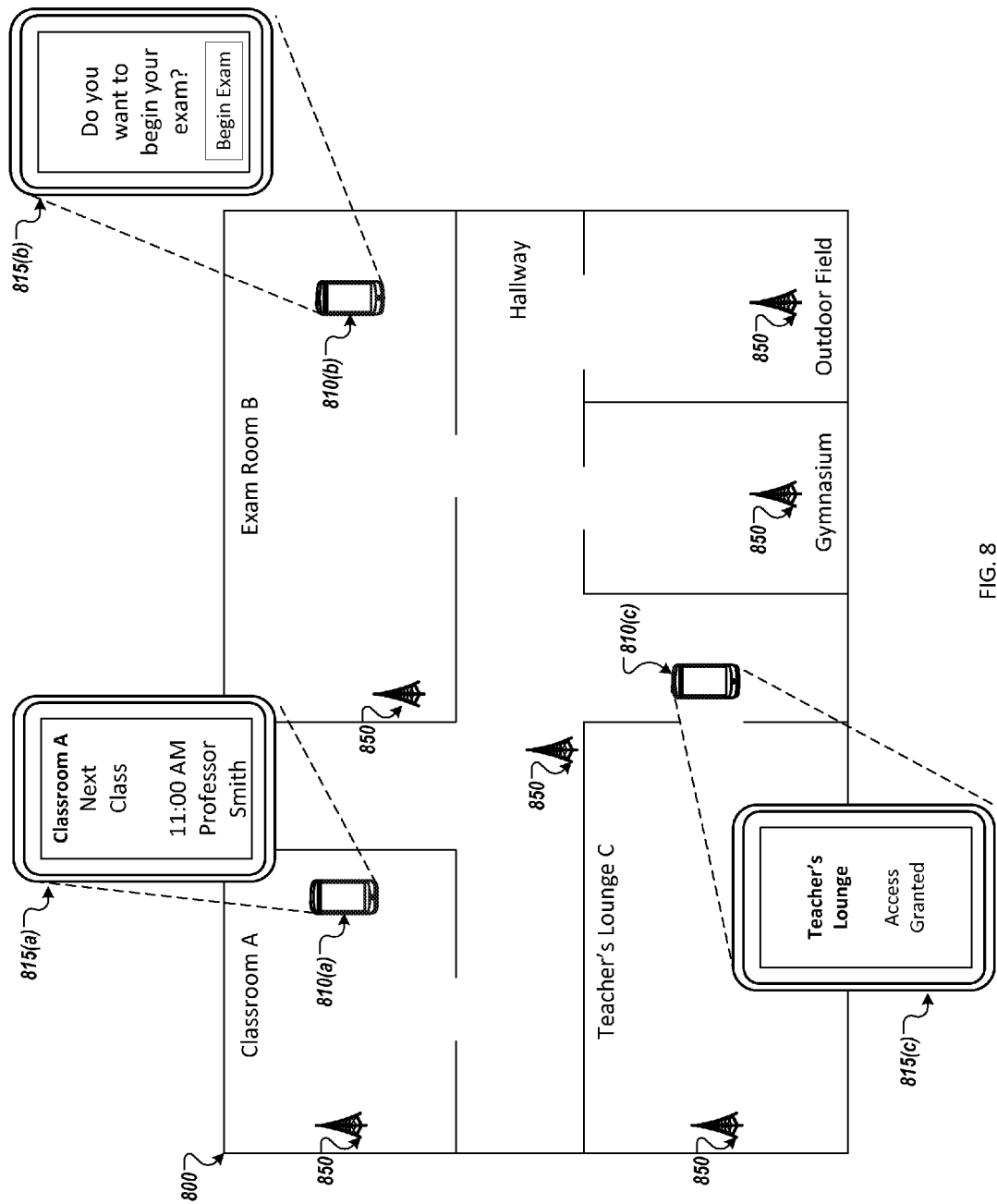
FIGS. 8-12 depict example implementations of systems for providing location-based information or services in a campus or a school using education proximity detection technology.

FIG. 8 illustrates an example system for providing location-based services in a campus or a school and information to client devices via an education proximity detection system. For example, a campus 800 may be associated with a proximity detection system that includes one or more wireless sensor beacons 850. Users that are associated with client devices 810(a)-810(c) such as students, professors, staff, or other visitors or personnel that are visiting or working on the campus 800 may be provided with location-based services or information based on the education proximity detection system determining that a client device 810(a)-810(c) is located in a particular location or region of the campus 800. Providing location-based services or information may include, for example, providing a client device 810(a)-810(c) with specific information, documents, or notifications based on determining that the client device 810(a)-810(c) is located in a particular location or region of the campus 800, may include providing a user of the client device 810(a)-810(c) with the ability to perform certain actions, including custom actions that are unique to the campus 800 or the proximity detection system, or may include providing a user of the client device 810(a)-810(c) with access to secured locations or regions of the campus 800. For example, the proximity detection system may determine that a client device 810(a) is located in a particular classroom A of the campus 800. The proximity detection system may determine that the client device 810(a) is located in a classroom of the campus 800 based on, for example, determining that the client device 810(a) is proximate to a wireless sensor beacon 850 located in the classroom of the campus 800. Based on determining that the client device 810(a) is identified as located in the classroom of the campus 800, the education proximity detection system can determine specific information, content, or a notification to present at a display or other interface 815(a) of the client device 810(a). For example, as shown in FIG. 8, a notification may be provided for output at the interface 815(a) that indicates that a next class conducted in classroom of the campus 800 occurs at 11:00 AM and is being taught by "Professor Smith." Such information may be presented automatically at the interface 815(a), or may be presented in response to a student interaction with the client device 810(a), for example, based on a user providing input to the client device 810(a) that requests information related to upcoming classes that are near the location of the client device 810(a).

In some instances, the information presented to the interface 815(a) may be based on determining whether a student associated with a client device 810(a) is registered for a particular class taught within the classroom within a particular time period. For example, the wireless sensor beacon 850 may be configured to operate based on a class schedule that includes a list events that take place in the classroom and a list of students registered for each particular event that takes place in the classroom. In such examples, the wireless sensor beacons 850 may transmit particular notifications over the interface 815(a) to particular students associated with the client device 810(a) based on the list of events from the class schedule and the list of students registered for each event. For example, the wireless sensor beacon 850 may transmit scheduling updates (e.g., class cancellations, exam schedules, substitute professors, etc.) to a client device 810(a) of a student registered for a particular event taking place in the classroom. In another example, the wireless sensor beacon 850 may exchange communications with a particular client device 810(a) to track attendance, determine times of occupancy, and/or transmit information during an event within the classroom.

Similarly, the proximity detection system may determine that a student associated with the client device 810(b) is located in or near exam room B of the campus 800. For example, the proximity detection system may determine that the student associated with the client device 810(b) is most proximate to a wireless sensor beacon 850 that is located in exam room B of the campus 800, and may therefore determine that the student associated with the client device 810(b) is likely located in exam room B of the campus 800. Alternatively, the proximity detection system may estimate a physical location of the student associated the client device 810(b) by performing a trilateration or multilateration process that is based on the proximity of the student associated with the client device 810(b) to each of multiple wireless sensor beacons 850 that are each associated with physical locations within the campus 800. Based on determining that the student associated with the client device 810(b) is likely located in the exam room B of the campus 800, the proximity detection system may determine to allow a student to perform a custom action. As shown in FIG. 8, for instance, the student of the client device 810(b) may be presented with an option at an interface 815(b) of the client device 810(b) to "begin exam" within the exam room B of the campus 800. The interface 815(b) may include information providing the student with the option to "begin exam" within the exam room B, along with a control that the user may select to perform the selected action. While the "begin exam" action shown in FIG. 8 is one example of an action that the student may perform, the student may be prompted to perform other actions or interactions with the proximity detection system or other systems based on the education proximity detection system determining that the student associated with the client device 810(b) is located in exam room B. For example, the student may be able to sign up for an email list relating to an event taking place in exam room B of the campus 800, may be able to provide their contact information to other school administrators located in exam room B of the campus 800, or may be capable of performing many other actions.

In some instances, the interfaces 815(a)-(b) may be used to verify information for students associated with the client devices 810(a)-(b), respectively, based on whether the students associated with the client devices 810(a)-(b) are registered for events taking place in the classroom and exam room B, respectively. For instance, if the education proximity detection system detects that a particular student associated with a client device 810(*a*) is not registered for a particular class presently taking place in the classroom, the education proximity detection system may present a notification over the interface 815(*a*) stating that the particular student is not registered for the class in the classroom. In another example, if the education proximity detection system detects that a particular student associated with the client 810(*b*) is currently located in an incorrect room for an exam, the education proximity detection system may send a notification to the interface 815(*a*) that instructs the particular student associated with the client device 810(*b*) to go to the correct examination room.

In another example, the proximity detection system can determine that the client device 810(*c*) of FIG. 8 is located near teacher's lounge C of the campus 800, where teacher's lounge C of the campus 800 may be a secured (e.g., locked) region of the campus 800. The education proximity detection system, based on determining that the client device 810(*c*) is located near teacher's lounge C of the campus 800 may determine that a user associated with the client device 810(*c*) is permitted to access teacher's lounge C of the property 800. For example, an account associated with the client device 810(*c*) or the user associated with the client device 810(*c*) may indicate that the user of the client device 810(*c*) has a credential or other permission that enables the user associated with the client device 810(*c*) to access the secured teacher's lounge C of the campus 800, such as the user being a member of teaching staff (e.g., a teacher, a professor, a teaching assistant, or an administrative assistant). Based on determining that the client device 810(*c*) is permitted to access the secured teacher's lounge C of the campus 800, the education proximity detection system may present information at an interface 815(*c*) of the client device 810(*c*) that indicates that the user associated with the client device 810(*c*) may access the secured teacher's lounge C. In some implementations, the proximity detection system may also perform other operations that enable the user associated with the client device 810(*c*) to access the secured teacher's lounge C of the campus 800, for example, by unlocking an entrance to the secured teacher's lounge C. Similarly, additional or different content may be provided at the interface 815(*c*) that informs and/or enables the user associated with the client device 810(*c*) to access the secured teacher's lounge C of the campus 800. For instance, the education proximity detection system may determine a physical representation of a credential, key, or other information that enables the user associated with the client device 810(*c*) to access the secured teacher's lounge C. As an example, an entrance to the secured teacher's lounge C may include a keyless entry system that requires a user to scan a quick response (QR) code, barcode, or other code that unlocks the entrance to the secured teacher's lounge C. In response to determining that the client device 810(*c*) is proximate to the entrance of the secured teacher's lounge C and that the user associated with the client device 810(*c*) is permitted to access the secured teacher's lounge C, the proximity detection system may cause a QR code to be displayed at the interface 815(*c*) that can be used to unlock the entrance to the secured teacher's lounge C.

In some instances, the education proximity detection system may display the interface 815(*c*) after checking the credentials of the user associated with the client device 810(*c*) against a registered user database of the campus 800. For example, the registered user database of the campus 800 may include information indicating, for instance, whether a user is a student, teacher, professor, teaching assistant, administrator, or other visitor or personnel visiting the campus 800. In such examples, the education proximity detection system may include various access configuration settings that specify, for example, general access (e.g., whether a particular user may enter the teacher's lounge), or conditional access (e.g., particular times and dates when a user may enter the teacher's lounge).

While several examples of actions or information that may be presented to a user of a client device 810(*a*)-810(*c*) have been presented, other information or actions may also be triggered based on the proximity detection system determining that a client device 810(*a*)-810(*c*) is located in a particular region of the campus 800, is proximate to a particular wireless sensor beacon 850 associated with the campus 800, or has a certain physical location within the campus 800. For example, based on a client device 810(*a*)-810(*c*) being identified as being in a certain region or physical location of the campus 800, or proximate to a certain wireless sensor beacon 850, a document may be transmitted to the client device 810(*a*)-810(*c*) for display at an interface 815(*a*)-815(*c*) of the client device 810(*a*)-810 (*c*). In some instances, such a document may only be accessible when the client device 810(*a*)-810(*c*) is determined to be located in the certain region or physical location of the campus 800, or proximate to a certain wireless sensor beacon 850. For instance, a user associated with a client device 810(*a*)-810(*c*) may only be permitted to access a certain sensitive document when the location of their client device 810(*a*)-810(*c*) is determined to be in a particular region of the campus 800 that corresponds to the user's office. In some instances, a user associated with a client device 810(*a*)-810(*c*) may be provided with information indicating that they may or may not access such a document, or other content, based on the proximity detection system determining their location or proximity to certain wireless sensor beacons 850. For instance, if a document may only be accessed by a user associated with the client device 810(*a*) while they are located in a classroom of the campus 800, the user may be presented at the interface 815(*a*) with information when they enter the classroom that indicates that they now have access to the particular document or content. If the user attempts to access the document or content when they are not located in the classroom of the campus 800, they may be presented with a notification indicating that they are not permitted to access the document or content at that time, but that they would be permitted to access the content or document if they were to move to the classroom of the campus 800. If the user has already accessed the document or content while located in the classroom, the user may also be presented with a notification at the interface 815(*a*) if they are nearing the edge of the classroom, for example, a notification that says "access to this document will be suspended if you leave this office."

In some examples, the action taken by a client device 810(*a*)-810(*c*) may be dependent upon the proximity detection system determining an action that a user of the client device 810(*a*)-810(*c*) is most likely to want or try to perform. For example, while a user of the client device 810(*a*) may be capable of performing a number of actions while located in the classroom of the campus 800, such as access a document, determine a class that is occurring next in the classroom of the campus 800, or "begin exam" in the exam room of the campus 800, the education proximity detection system may determine that the user is most likely to request what class is occurring next in classroom, and may therefore determine to provide that information for display at the interface 815(*a*) of the client device 810(*a*), in lieu of, for example, presenting a certain document to the user at the interface 815(*a*).

In some examples, determining the action may involve evaluating one or more candidate actions to determine which action a user is most likely to want or try to perform while in the particular region or physical location of the campus 800, or while they are proximate to a specific wireless sensor beacon 850. For instance, each of multiple candidate actions may be associated with a relevance score that indicates the perceived relevance of particular actions to the particular region or physical location within the campus 800, or the perceived relevance of particular actions when a client device 810(*a*)-810(*c*) is proximate to a particular wireless sensor beacon 850. The relevance score may further indicate, for example, an estimated confidence of certain actions being relevant to the particular region, physical location, or wireless sensor beacon 850. In some instances, a relevance score may be based at least in part on history data that indicates actions that users of client devices 810(*a*)-810(*c*) have performed while in the particular region, physical location, or near the wireless beacon 850, such that the relevance score is influenced by past user behavior. The education proximity detection system may determine an action to perform by selecting a particular action from among the candidate actions based at least in part on the relevance score of each of the candidate actions, or based on other information.

As an example, if history data indicates that a student associated with a client device 810(*a*)-810(*c*) is more likely to use their client device 810(*a*)-810(*c*) to log in to a computer system when they are located in a certain region of the campus 800 as opposed to accessing a document or desiring to "begin exam" in the exam room of the campus 800, the relevance score for an action to log in to the computer system may be greater than the relevance scores associated with accessing a document or performing a "begin exam" at the exam room of the campus 800. Based at least on the relevance scores for these candidate actions, the education proximity detection system may determine to log the student associated with the client device 810(*a*)-810(*c*) into the computer system, and not to access a document or perform a "begin exam" at the exam room of the campus 800.

In some examples, the education proximity detection system may determine that two or more client devices 810(*a*)-810(*c*) that are associated with a single student must be present in certain locations or regions of the campus 800, or proximate to certain wireless sensor beacons 850, to enable an action. For example, a student may be associated with both a mobile computing device and an instructional clicker device that are each in communication with the education proximity detection system. Certain actions may require that the mobile computing device and instructional clicker device be located in specific regions or locations of the campus 800, or proximate to a certain wireless sensor beacon 850 to allow the actions to be performed. Alternatively, certain actions may require that the mobile computing device and instructional clicker device be in the same region or location of the campus 800, or proximate to the same wireless sensor beacon 850, for the actions to be performed.

For example, for the student to participate in a lecture within a particular class, the education proximity detection system may require that both the mobile computing device and instructional clicker device associated with the user are located in the classroom of the campus 800. The education proximity detection system may determine whether both the mobile computing and instructional clicker devices are located within the classroom of the campus 800, and if both devices are not determined to be located in the classroom of the campus 800, the student may be prohibited from participating in the lecture. In a similar example, participating in the lecture using the mobile computing device may require that the mobile computing device and instructional clicker device are located in the same region or physical region of the campus 800, or are proximate to the same wireless sensor beacon 850. Upon the student requesting to participate in the lecture using the mobile computing device, the education proximity detection system may determine the regions or physical locations where each of the mobile computing device and instructional clicker device are located, or may determine the wireless sensor beacon 850 nearest to each of the mobile computing device and instructional clicker device. Participation in the lecture using the mobile computing device may be permitted if the education proximity detection system determines that the two devices are located in the same region of the campus 800, if the physical locations of the mobile computing device and instructional clicker device are within a threshold proximate distance of one another, or if the mobile computing device and instructional clicker device are nearest to the same wireless sensor beacon 850.

In other examples, the education proximity detection system may use the wireless sensor beacon 850 to regulate access to events within particular regions or locations in the campus 800. For example, during a sporting event in the gymnasium, the education proximity detection system may be used to determine if students associated with the client devices 810(*a*)-(*c*) have tickets to the sporting event. A particular client device 810(*a*)-(*c*) may initially detect a wireless sensor beacon 850 in the gymnasium when the particular client device 810(*a*)-(*c*) is in proximity with the wireless sensor beacon 850 in the gymnasium. The education proximity detection system may then determine if the particular client device 810(*a*)-(*c*) has tickets to the sporting event within the gymnasium and track attendance by adding the student associated with the particular client device 810(*a*)-(*c*) to an attendee list in response to determining that the particular client device 810(*a*)-(*c*) is near the proximity of the wireless sensor beacon 850.

Figure 9:
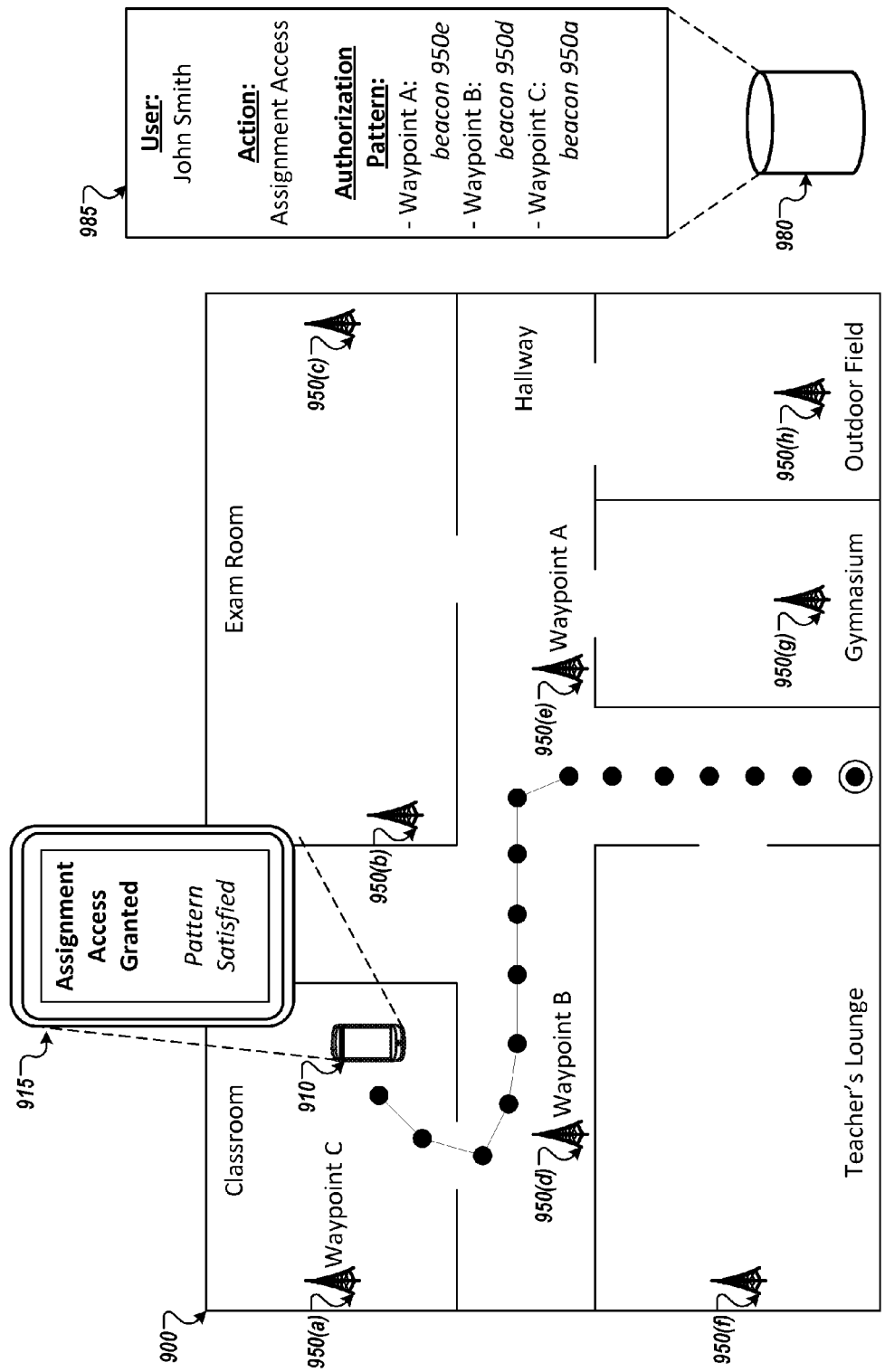

FIG. 9 illustrates another example system for providing location-based educational services and content to a student associated with a client device 910. In some implementations, as shown in FIG. 9, for a student associated with a client device 910 to perform a certain action, the education proximity detection system must first determine that a path of movement of the client device 910 satisfies a pattern of movement that is associated with performing the action.

For example, the education proximity detection system may include a database 980 that stores one or more patterns 985 that are each associated with a particular student, client device, and/or action. For example, the pattern 985 shown in FIG. 9 may be specific to the student "John Smith" associated with the client device 910. The pattern 985 may require the client device to follow a path that includes waypoints before "John Smith" is permitted to perform the action of accessing an assignment using the client device 910. Specifically, as shown in FIG. 9, the pattern 985 may require that the client device 910 pass each of waypoint A, corresponding to wireless sensor beacon 950(*e*), waypoint B, corresponding to wireless sensor beacon 950(*d*), and waypoint C, corresponding to wireless sensor beacon 950(*a*) before the user is permitted to access a document using the client device 910. In some implementations, for the pattern 985 to be satisfied, the education proximity detection system may require that the path of movement of the client device 910 satisfies each of the waypoints in order (i.e., that the path of movement proceed from waypoint A to waypoint B and then to waypoint C), or may not require that the path of movement of the client device 910 satisfy each of the waypoints in a particular order, but only that each waypoint must be satisfied. In some examples, satisfying a waypoint may involve determining that a location of the client device 910 is within a certain region of the campus 900, that a physical location of the client device 910 determined by the proximity detection system is within a threshold distance of a particular wireless sensor beacon 950(*a*)-950(*h*), or that the client device 910 is within a threshold proximity of a wireless sensor beacon 950(*a*)-950(*h*).

Following the example shown in FIG. 9, the student "John Smith" may enter the campus 900 and the education proximity detection system may begin tracking a path of movement of the client device 910 associated with the student. Tracking the path of movement of the client device 910 may be performed, for example, using the methods discussed with respect to FIG. 6. Upon entering the campus 900, the client device 910 may be detected as passing near the wireless sensor beacon 950(*e*) corresponding to the waypoint A. For example, the waypoint A may be located near a lobby or security checkpoint in the campus 900 that the student must pass when entering the campus 900. The education proximity detection system may further determine that the client device 910 has passed the wireless sensor beacon 950(*d*) corresponding to waypoint B, and then determine that the client device 910 has passed the wireless sensor beacon 950(*a*) corresponding to waypoint C. Based on determining that the path of movement of the client device 910 has satisfied each of the waypoints provided for in the pattern 985, the proximity detection system may determine that the student "John Smith" is permitted to perform the action of accessing an assignment using the client device 910. In response to the determination, the proximity detection system may optionally provide a notification at an interface 915 of the client device 910 indicating that the pattern 985 has been satisfied. For example, the notification "Assignment Access Granted" may be presented at the interface 915 in response to determining that the path of movement of the client device 910 has satisfied the pattern 985.

In some implementations, the pattern 985 may be predetermined and stored in the database 980 of the education proximity detection system. For example, the pattern 985 may be specified by one or more administrators associated with the education proximity detection system. Additionally or alternatively, the pattern 985 may be determined based on tracking the movement of the client device 910 over time. For example, based on determining that the client device 910 typically passes by each of the waypoints A, B, and C before the student "John Smith" attempts to access a document using the client device 910, the education proximity detection system may establish as the pattern 985 the waypoints A, B, and C as shown in FIG. 9. In some examples, a pattern 985 may be updated or evolve over time, for example, based on determining that more waypoints are needed to ensure that the path of the client device 910 satisfied the path that is intended to be required of the client device 910 before the client device 910 is granted permission to perform the action. In another example, if the proximity detection system determines that, over time, a student associated with the client device 910 follows a different path before attempting to perform the action, the proximity detection system may update the pattern 985 to match the new path.

In some instances, requiring that a path of movement of the client device 910 must satisfy a pattern 985 before permission to perform a particular action is granted allows for additional security, as attempts to perform the action where the client device 910 has not satisfied the pattern 985 may indicate a fraudulent attempt to perform the action, an error with the proximity detection system or the client device 910, or other events or anomalies, such as a student working in a different area than they typically work in the campus or university. Such event or anomaly detection may also be used outside of the context of gaining permission to perform certain actions. For example, the education proximity detection system may monitor paths of movement of one or more client devices and may be able to detect anomalous events, such as emergencies, based on the path of movement of the one or more client devices. For example, based on determining that a number of client devices follow a path toward an exit of a building at the same time, where such movement is not typical, the proximity detection system may determine that a possible emergency (e.g., a fire) has occurred in the campus building, and may react to the determination (e.g., by notifying the campus security authorities, sounding a fire alarm, etc.).

Figure 10:
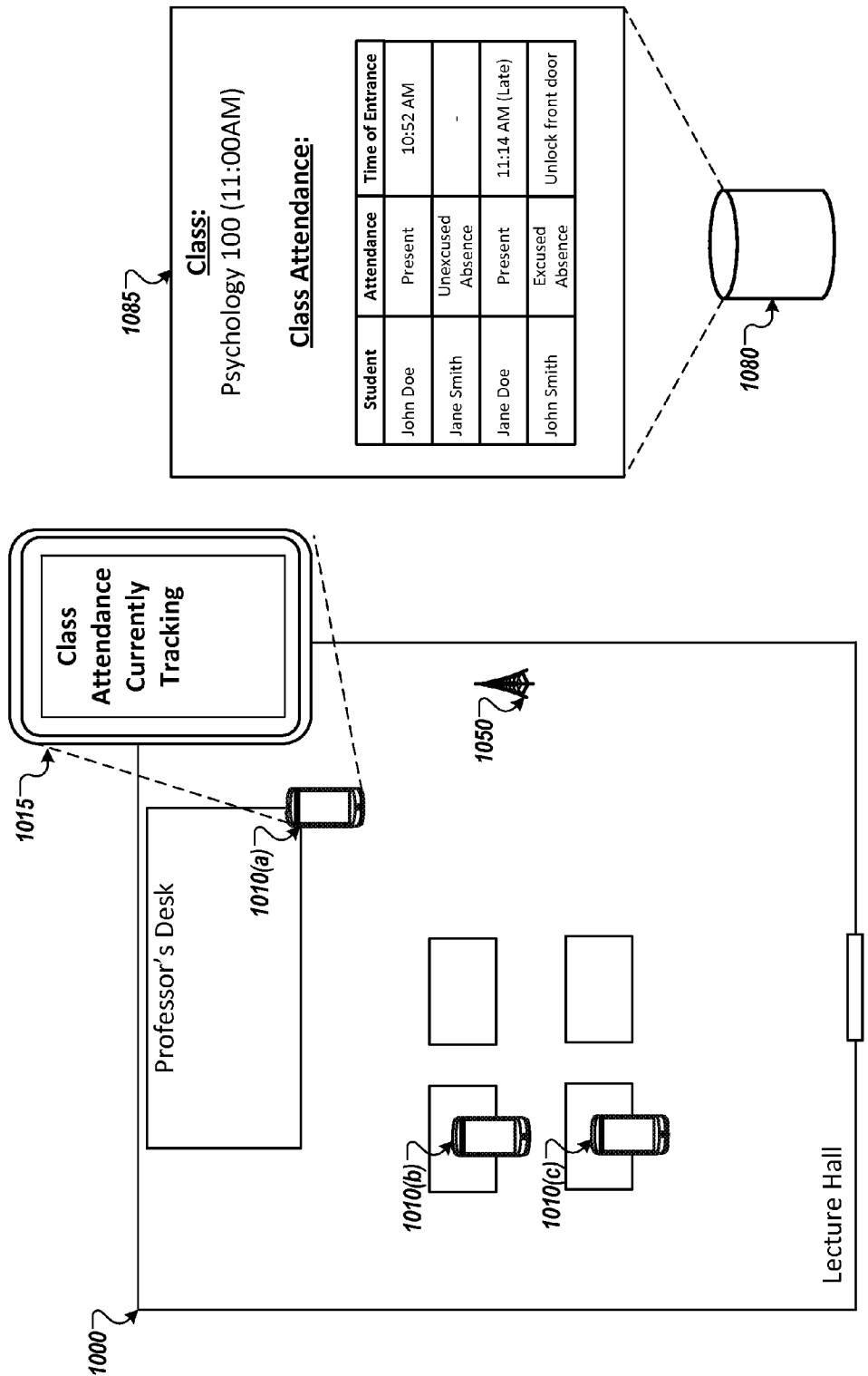

FIG. 10 illustrates another example system for providing location-based educational services and content to students associated with client devices 1010(*a*)-1010(*c*). As represented in the example in FIG. 10, in some implementations, the education proximity detection system may be used to determine student presence to track class attendance within a classroom 1000. In such implementations, the education proximity detection system may include a database 1080 that stores attendance data 1085.

For example, a lecture hall 1000 may have a wireless sensor beacon 1050 to exchange communications with the client devices 1010(*a*)-1010(*c*) to track attendance data 1085 for students associated with the client devices 1010(*a*)-1010(*c*) and the education proximity detection system stores the attendance data 1085 in the database 1080. In some instances, the attendance data 1085 may be displayed on the interface 1015 of the client device 1010(*a*), which may be associated with an instructor or a professor of the class in the lecture hall 1000. The proximity detection system may detect the client devices 1010(*b*)-1010(*c*) during a particular time period that corresponds to the scheduled beginning of the class. For example, as represented in FIG. 10, the proximity detection system may initially begin collecting proximity data from the client devices 1010(*b*)-1010(*c*) before 11:00 AM to determine if the students associated with the client devices 1010(*b*)-1010(*c*) are in attendance of the class "Psychology 100." As shown, the student "John Doe" may be determined to be "present" based on proximity data from the client device 1010(*b*) indicating that the student is currently present in the lecture hall 1000. In another instance, the students "Jane Smith" and "John Smith" may be determined to be "absent" based on the proximity detection system not detecting proximity data from client devices associated with these students or other proximity in the campus at the start of the "Psychology 100" class. In such instances, the proximity detection system may identify students associated with particular client devices using a student identification number. In some instances, the proximity detection system may also use a student profile that includes absence notes to determine whether the absence is excused or unexcused. For example, as represented in FIG. 10, the student "John Smith" may be determined to have an "excused absence" because the student profile associated "John Smith" may include an absence note submitted by a parent or legal guardian.

The proximity detection system may also log the time when the client devices 1010(*b*)-1010(*c*) are initially detected within the lecture hall 1000 to determine if the student is on time or late to the class within the lecture hall 1000. For example, as represented in FIG. 10, the proximity detection system may initially detect proximity data from the client device 1010(*b*), which is associated with the student "John Doe," at 10:52 AM, indicating that the student "John Doe" was on time to the "Psychology 100" class at 11:00 AM. In another example, the proximity detection system may detect proximity data from the client device 1010(*c*), which is associated with the student "Jane Smith," at 11:14 AM, indicating that the student "Jane Smith" was late to the "Psychology 100" class.

Figure 11:
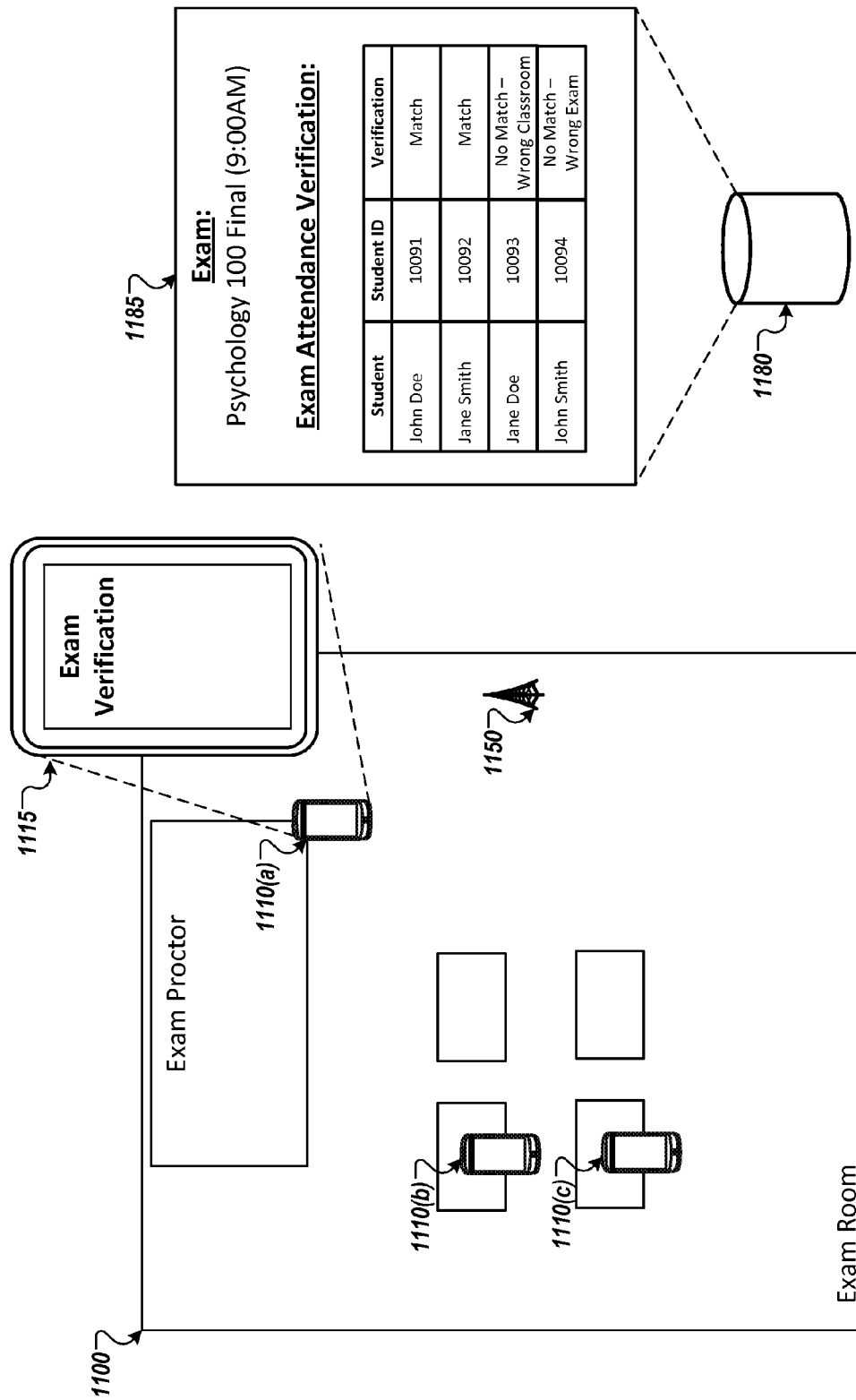

FIG. 11 illustrates another example system for providing location-based educational services and content to users associated with client devices 1110(*a*)-1110(*c*). As represented in the example in FIG. 11, in some implementations, the education proximity detection system may be used to verify particular types of users during an event within a school or a campus.

For example, an exam room 1100 may have a wireless sensor beacon 1110 that is used to transmit exam verification data 1185 for a scheduled exam to be taken by students associated with the client devices 1110(*b*)-1110(*c*) and administered by a proctor that is associated with the client device 1110(*a*). The exam verification data may be stored on the database 1180 and, in some instances, may be displayed on the interface 1115 on the client device 1110(*a*) that is associated with the exam proctor. In such instances, the exam verification data 1185 may include student information such as student name, student ID, and a verification of whether the student has shown up for the correct exam. For example, as represented in FIG. 11, the proximity detection system may detect proximity data from the client devices 1110(*b*)-1110(*c*) and determine whether the students associated with the client devices 1110(*b*)-1110(*c*) are in the correct room based on accessing an examination roster that includes student information and exam information. For instance, the proximity detection system may initially access a student profile after detecting proximity data to determine student information such as "student name," and "student ID," and then may compare the student information with the examination roster to determine "verification." For example, in response to determining that the proximity data indicating the current room for the student "John Doe" matches the examination information in the examination roster, the exam verification data may indicate a "match," indicating that the student "John Doe" has shown up to the correct examination and examination room. In instances where the proximity data for a student does not match the examination information specified within the examination roster, the proximity detection system may also determine whether the student is in the wrong room or the examination. For example, based on comparing the room number of exam room 1100 and the room identified by the examination roster as being associated with the student "Jane Doe," the proximity detection system may determine that the student "Jane Doe" is in the wrong classroom. In other instances, the proximity detection system may also compare the examination associated with the exam room 1100 with the examination specified by the examination roster for the student associated with the client devices 1110(*a*)-1110(*b*). For example, based on comparing the identified examinations, the proximity detection system may determine that the student "John Smith" is not in the correct examination in the exam room 1100, "Psychology 100 Final" and is instead scheduled to take the "Sociology 100 Final" in another room.

Although FIG. 11 represents an example technique used by the education proximity detection system to verify students for examinations, in other examples, the education proximity detection system may be used to verify tickets for campus or university events. For instance, the education proximity detection system may include a wireless sensor beacon 1150 placed near the entrance of an event such as, for example, a ticketing booth. In such instances, the proximity detection system may receive information from client devices 1110(*a*)-1110(*c*) that includes event tickets and, in response to detected proximity near the wireless sensor beacon 1150, the proximity detection system may compare the received information against an event repository to determine if the user associated with the client devices 1110(*a*)-1110(*c*) have the correct tickets to the event taking place in the location where the wireless sensor beacon 1150 is located. In some instances, the proximity detection system may also restrict access to events where the information received from the client devices 1110(*a*)-1110(*c*) indicates that the user associated with the client devices 1110(*a*)-1110(*c*) may not have the correct privileges to attend the event. For example, if the event taking place is for a particular student group and the information from the client devices 1110(*a*)-1110(*c*) that the student associated with the client devices 1110(*a*)-1110(*c*) is not included in the particular student group, the proximity detection system may restrict access.

Figure 12:
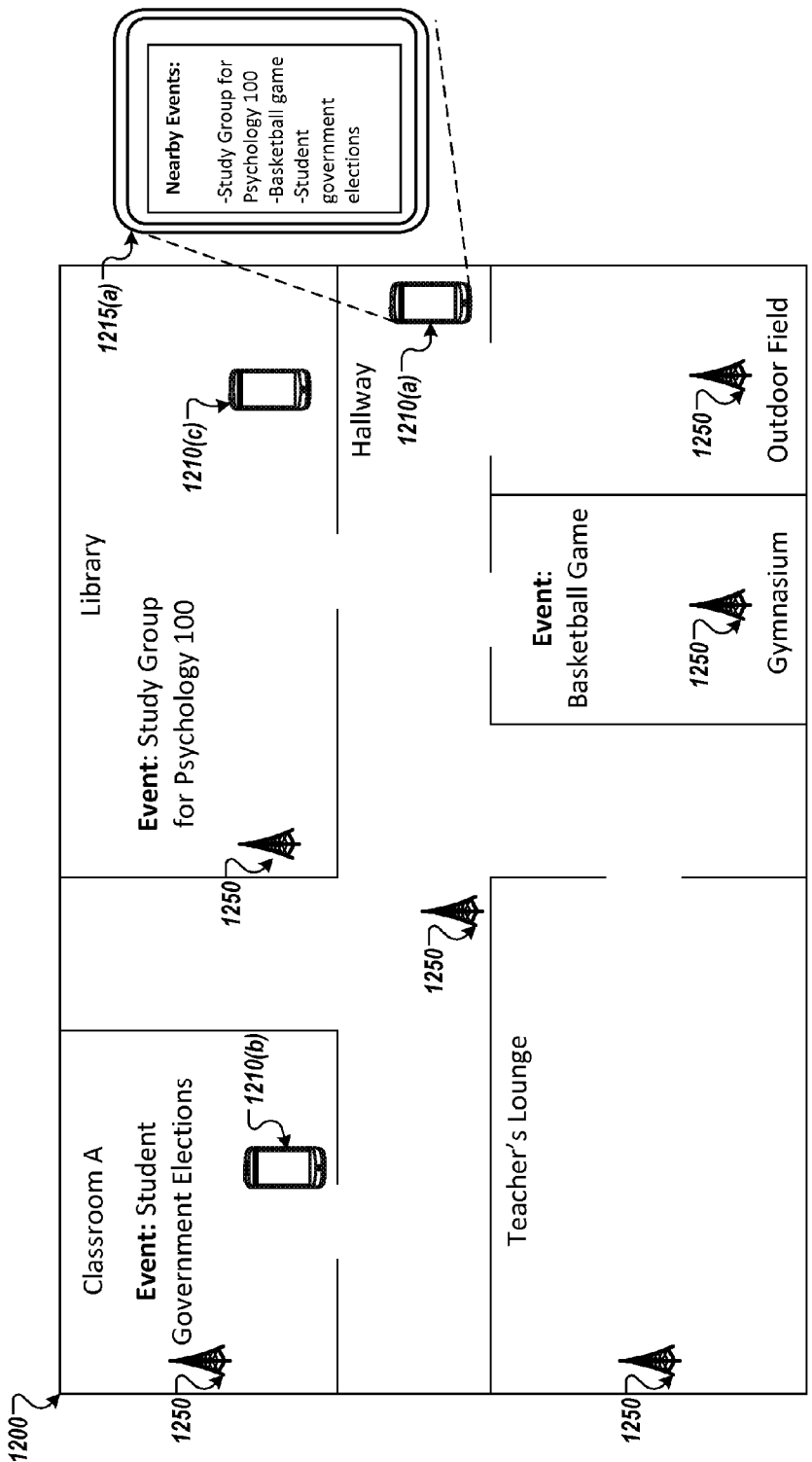

FIG. 12 illustrates another example system for providing location-based educational services and content to users associated with client devices 1210(*a*)-1210(*c*). As represented in the example in FIG. 12, in some implementations, the education proximity detection system may be used to associate students within a school or university based on school data and provide notifications for nearby events within the school.

For example, a campus 1200 may include different wireless sensor beacons 1250 placed in different locations or regions of the campus 1200 such as, for example, a classroom, a library, a gymnasium, or an outdoor field. The proximity detection system may detect proximity data from a client device 1210(*a*), which is nearby a location where a particular event is being held, and from client devices 1210(*b*)-1210(*c*), which are currently inside the particular location where a particular event is being held. In response to the proximity detection system detecting the nearby client device 1210(*a*), the proximity detection system may transmit information to display on the interface 1215(*a*) of the client device 1210(*a*). For example, as represented in FIG. 12, the interface 1215(*a*) may display a list of events that are nearby the client device 1210(*a*).

In some implementations, in response to detecting the proximity data of the client device 1210(*a*) nearby a particular event, the proximity detection system may access a student profile for the student associated with the client device 1210(*a*) that indicates, for example, classes that the student may be currently enrolled in, student organizations that the student has signed up for, and general school activities that the student may be interested in. The proximity detection system may then determine that the particular event within the particular location may be of interest to the student associated with the client device 1210(*a*) and, in response, transmit information related to the particular event for display on the interface 1215(*a*). For example, as shown in FIG. 12, the proximity detection system may transmit information related to the event "Student Government Elections" based on detecting proximity data from the client device 1210(*a*) and determining that the student associated with the client device 1210(*a*) may be interested in student government elections based on the student profile indicating that the student associated with the client device 1210(*a*) has participated in past student government events. In another example, the proximity detection system may transmit information related to a study group for "Psychology 100" based on determining that the student associated with the client device 1210(*a*) is currently enrolled in the same class as the study group. In yet another example, the proximity detection system may transmit information related to the "Basketball Game" based on determining that the student associated with the client device 1210(*a*) plays for the school basketball team.

Figure 13:
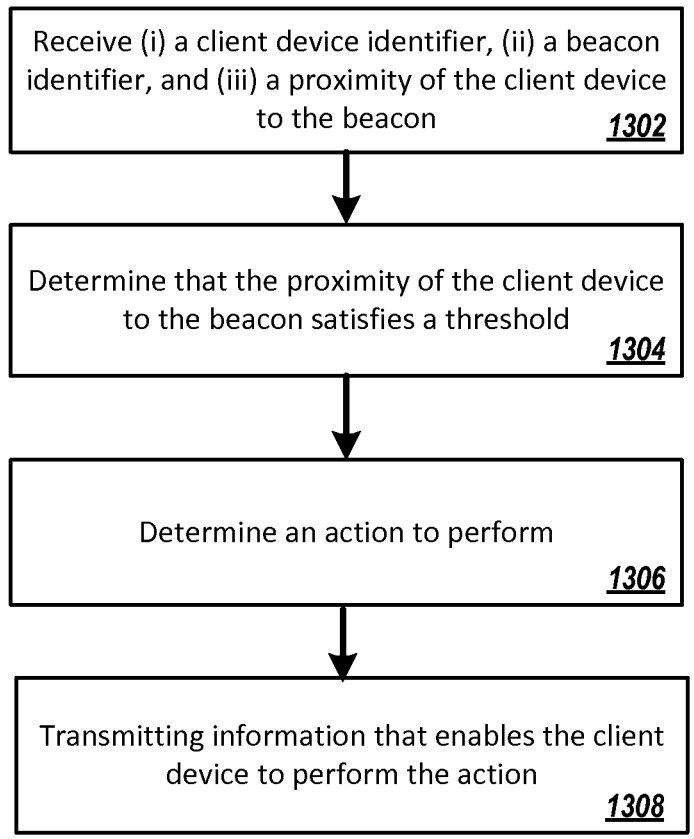
FIG. 13 depicts an example implementation of a process related to providing location-based information or services in a campus or a school using education proximity detection technology.

FIG. 13 illustrates an example process 1300 for providing location-based educational services and information to a client device using an education proximity detection system. In some examples, the process 1300 may be performed by the education proximity detection system 100 of FIG. 1.

Educational information is received that indicates a client device identifier associated with a client device, a beacon identifier associated with a wireless sensor beacon, and a proximity of the client device to the wireless sensor beacon (1302). For example, the location engine 130 of FIG. 1 may receive educational information from a client device 110(*a*)-110(*b*) that is running an instance of an education proximity detection system application that includes an identifier that uniquely identifies a client device 110(*a*)-110(*b*), that includes an identifier that uniquely identifies a wireless sensor beacon 150(*a*)-150(N) in the education proximity detection system 100, and that indicates a proximity of the identified client device 110(*a*)-110(*b*) to the identified wireless sensor beacon 150(*a*)-150(N). In some implementations, the educational information may be received by the location engine 130 over the one or more networks 120. The educational information indicating the proximity of the client device 110(*a*)-110(*b*) to the wireless sensor beacon 150(*a*)-150(N) may be received from the client device 110(*a*)-110(*b*), or alternatively may be computed by the location engine 130, for example, based on receiving educational information that indicates a strength of a wireless signal emitted by the wireless sensor beacon 150(*a*)-150(N) detected by the client device 110(*a*)-110(*b*).

In some implementations, the educational information may include, for example, class registrations of a student associated with the client device 110(*a*)-110(*b*), assignments for classes that include the student associated with the client device 110(*a*)-110(*b*), access information related to whether a particular user of the client device 110(*a*)-110(*b*) may have the credentials to enter a particular location within a campus or university such as a teacher's lounge or a restricted office space.

A determination is made that the proximity of the client device associated with the client device identifier to the wireless sensor beacon associated with the beacon identifier satisfies a threshold proximity (1304). For example, the location engine 130 may receive or determine the proximity of the identified client device 110(*a*)-110(*b*) to the identified wireless sensor beacon 150(*a*)-150(N), and may compare the proximity to a threshold. The proximity threshold may be a predetermined proximity threshold, such as one set by an administrator of the education proximity detection system, or may be a proximity threshold that is otherwise determined. For example, the proximity threshold may be determined based on a machine learning process that optimizes the proximity threshold based on tracking performance of the education proximity detection system 100 for various proximity thresholds. The location engine 130 may determine that the proximity of the client device 110(*a*)-110(*b*) to the wireless sensor beacon 150(*a*)-150(N) satisfies the proximity threshold based on, for example, determining that the proximity is less than the proximity threshold, thereby indicating that the client device 110(*a*)-110(*b*) is within a threshold proximity of the identified wireless sensor beacon 150(*a*)-150(N).

In some implementations, the threshold may be used to determine attendance information related to a particular class being taught within a particular classroom within a campus or university. For instance, the location engine 130 may determine that the proximity of the identified client device 110(*a*)-110(*b*) to the identified wireless sensor beacon 150(*a*)-150(N) indicates presence within a particular classroom when a particular class is being taught. In response to determining that the proximity of the identified client device 110(*a*)-110(*b*) satisfies the predetermined proximity threshold (e.g., within the boundaries of the classroom), the location engine 130 may track attendance of the particular class based on receiving information from the identified client device 110(*a*)-110(*b*).

Based on determining that the proximity of the client device associated with the client device identifier to the wireless sensor beacon associated with the beacon identifier satisfies the threshold, an action to be performed is determined (1306). For example, based on the location engine 130 determining that the client device 110(*a*)-110(*b*) associated with the client device identifier is within the threshold proximity of the identified wireless sensor beacon 150(*a*)-150(N), the location engine 130 can determine an action for the identified client device 110(*a*)-110(*b*) to perform. For example, the determined action may be an action to present or provide access to an assignment or other educational content, to provide a notification, to grant access to a particular region, location, or other area of a campus or university, to perform a custom action, to request information from a student, or to perform another action. In some examples, determining the action to perform may involve determining an action that the client device 110(*a*)-110(*b*) is otherwise permitted to perform, for example, based on a path of movement of the client device 110(*a*)-110(*b*) satisfying a specific movement pattern as discussed with respect to FIG. 9. In some examples, the action may be determined based on the wireless sensor beacon 150(*a*)-150(N) that the client device 110(*a*)-110(*b*) is determined as being proximate to. For example, the location engine 130 may determine one action based on the client device 110(*a*)-110(*b*) being proximate to a particular wireless sensor beacon 150(*a*)-150(N), and may determine another action based on the client device 110(*a*)-110(*b*) being proximate to another wireless sensor beacon 150(*a*)-150(N).

Educational information is transmitted to the client device associated with the received client device identifier that enables the client device to perform the action (1308). For example, the location engine 130 may provide educational information to the identified client device 110(*a*)-110(*b*) that causes or enables the identified client device 110(*a*)-110(*b*) to perform the determined operation. In some instances, the information may be provided over the one or more networks 120 of the education proximity detection system 100. The identified client device 110(*a*)-110(*b*) may receive the educational information enabling performance of the determined action, and in response may perform the action.

The described methods can be implemented in any number of different settings where it would be useful to have capabilities to track the location of one or more client devices, and to access and share additional information among the client devices that relates to users of the client devices or to the client devices themselves.

For example, a proximity detection system may be associated with a campus or school associated with providing educational services. The proximity detection system associated with the space may provide services to students, professors, staff, or other visitors or personnel that are visiting or working on the campus or at the school. In some implementations, one or more of these groups of people (e.g., students or professors) may utilize a specific application hosted by their client device that is associated with the proximity detection system. The group-specific applications may provide services that are specific to that group. For example, students may use a student-specific version of an application that is hosted on their client devices, while professors, lecturers, staff, teaching assistants, security, or other personnel working at the school or campus may use an educator-specific version of an application that is hosted on their client devices. The services provided by the student application and the educator application may be different, or both applications may provide some or all of the same services.

In some implementations, the proximity detection system associated with a campus or school may have access to information relating to various students, professors, teachers, teaching assistants, administrators, staff, coaches, or other visitors or personnel working at the campus or school. In some implementations, information relating to a student, professor, or other visitor or personnel working at the campus or school can be specified in a personal profile that is associated with the student, professor, or other visitor or personnel. The proximity detection system may also be able to access scheduling information or other information associated with the campus or school, such as a schedule of classes or events taking place at a school or on a campus. Other information accessed by the proximity detection system that is associated with the school or campus can include a map or other information identifying locations of various buildings or facilities at the school or on the campus or where certain events, classes, or activities are held at the school or campus, information identifying students and personnel that attend or work at the school or campus, etc. In some instances, the information accessed by the proximity detection system is available over one or more networks, such as the network 120. For example, the location engine 130 or a client device 110(*a*)-(*b*) may be able to access such information over the network 120. Such information may be accessible, for example, at a server, database, or other resource that is maintained by the school or campus, an affiliate of the school or campus (e.g., a company that manages student information for the school or campus), or other resource that is accessible by the location engine 130 or client device 110(*a*)-(*b*) over the network 120. In some implementations, the location engine 130 may store such information locally, such that the client device 110(*a*)-(*b*) may access the information over the network 120. In still other implementations, the client device 110(*a*)-(*b*) may store such information locally. The proximity detection system can integrate such information with location information determined for a user (e.g., a student's or professor's location) to provide various services to the user.

In some implementations, students or visitors of a school, campus, or other space associated with providing educational services may be provided with location-based services offered by the proximity detection system. The students or visitors may be provided these services by using a student application hosted on their client devices. The proximity detection system may be able to determine the presence and/or movement of the students or visitors within a school, campus, or other space associated with providing educational services. Based on this location information and other information accessible by the proximity detection system, the proximity detection system can provide services useful to the students or visitors.

For example, the proximity detection system may be capable of determining a location of a user of the student application and may be able to provide the user of the student application with navigation services that are based on the user's location. As an example, a student using the student application may desire directions to navigate from their current location on a campus to a particular building or classroom on the campus. The proximity detection system may determine the student's current location, for example, based on determining using the proximity detection technology described that the student is at a particular location on the campus, that the student is located in a particular building of the campus, or that the student is located in a particular classroom on the campus. The proximity detection system may also be able to determine the location of the student's destination, for example, the location of the building or classroom that the student is attempting to navigate to. Based on determining the student's location and the location of the student's destination, the proximity detection system may provide navigation services to the student that direct the student to their destination. Such navigation services may include a map showing a route from the student's location to the destination, a set of directions defining the route from the student's location to the destination, an estimate of the travel time for the student to walk, ride a bike, or otherwise commute from their location to their destination, etc.

In some implementations, the proximity detection system can identify other information associated with a user of the student application, and can automatically determine or suggest destinations for the user of the student application. For example, a student using an instance of a student application that is hosted on their client device may associate their application instance or client device with a personal profile that is associated with the student. The personal profile may specify information about the student (e.g., their name, age, student identification number, grade level or standing, etc.,) or the student's activity at the school or campus (e.g., a class schedule, a list of activities or clubs that the student is involved in, the student's major, the student's interests, etc.). Based on the student "linking" their personal profile to the student application instance or their client device, the proximity detection system may determine or suggest a destination for the student, and can provide navigation services directing the student to that destination. For instance, the proximity detection system may determine from the student's class schedule that their next class is located in a particular classroom of a particular building on a school campus, and can provide the student with navigation from their current location to the particular classroom. In some implementations, destinations and/or navigation services can be provided based on an estimated commute time for the student from their current location to a particular destination. For example, the proximity detection system can determine that the student has a class at 11:00 AM in a particular classroom in a particular building on a campus, can determine that the estimated time for the student to commute to the classroom from their current location is ten minutes, and can provide a notification and/or navigation services to the student based on the class time and the estimated commute time, for instance, by providing the student with a notification at 10:50 AM that they should start walking to their class. Similar notifications may be based on other determinations made by the proximity detection system. For instance, the proximity detection system may access information indicating that the student would like to attend a certain event (e.g., based on the user sending an RSVP or having a ticket to the event), and can provide the student with a reminder and/or navigation to the event based on determining a route that the student can take to go to the event, a wait time to enter the event, etc. Such information may be determined by the proximity detection system, for example, by estimating the wait time to enter the event based on determining the concentration of other students near the event, a number of students detected as being in line for the event, etc. In some implementations, the student application may be able to provide the student with navigation services at a school or on a campus based on the proximity detection system associated with the school or campus having access to a map, class schedule, or other information associated with the school or campus.

Additionally, in some implementations, a user using a student application may be able to identify, connect with, or interact with other users using applications associated with a proximity detection system for a school or campus. For example, a student having a student application may be able to identify professors for classes they are enrolled in, other students in a class that the student is enrolled in, other students that are near the student, and/or other users of an application associated with the proximity detection system (e.g., teaching assistants, administrators, guest lecturers, etc.). The proximity detection system can enable the student to connect or otherwise interact with one or more of the other students, professors, or other users. In some implementations, identifying the relevant other students, professors, or other users can involve accessing a personal profile associated with the student and/or personal profiles associated with the other students, professors, or other users.

For example, a student application hosted by a particular student's client device may identify other students that are in the same class as the particular student. The other students may be identified by the proximity detection system based on the proximity detection system accessing personal profile information associated with the other students. For example, the proximity detection system may identify other students whose class schedules include the same classes as the particular student.

Similarly, a student application hosted by a particular student's client device may identify professors or other individuals (e.g., teaching assistants) that are associated with the classes that the particular student is enrolled in. The professors or other individuals may be identified based on class schedules accessed at personal profiles associated with the student, the professors, or the other individuals that indicate that the professors or other individuals are teaching or otherwise associated with the same classes in which the particular student has enrolled.

In some implementations, identifying students, professors, or other individuals may additionally or alternatively be dependent upon the location of the students, professors, or other individuals. Identifying the students, professors, or other individuals may be dependent on their physical locations, a history of their physical locations, and/or their physical locations relative to the physical locations of a particular student. For example, the proximity detection system can estimate a location of a particular student as well as the locations of other students that are near the particular student. The student application may present the particular student with information identifying those students that are closest to the particular student, for example, other students that are in the same building, classroom, lecture hall, or other area as the particular student, or other students that are within a threshold distance (e.g., 100 feet) from the particular student.

In some implementations, the student application can identify other students, professors, or other individuals based on the location of the other students, professors, or other individuals (e.g., the physical location of the other students or the locations of the other students relative to the particular student) and based on other information associated with the other students, professors, or individuals. For example, the student application may only identify those students that are within a threshold distance of the particular student and that are enrolled in a class with the student. The other students may be determined based on estimating the locations of the particular student, the other students near the particular student and/or the students who are enrolled in the same classes as the particular student, and personal profile information associated with the particular student and the other students.

Identifying the other identified students, professors, or other individuals to a particular student using the student application may involve presenting the student with a list of the other students, professors, or other individuals, a map of the school or campus that shows the locations and/or information associated with the other students, professors, or other individuals, or identifying the other students, professors, or individuals. In some instances, the proximity detection system may have access to other resources associated with the school or campus or the other students, professors, or individuals to provide the particular student with additional services. For example, the accessed information may include maps of the school or campus, the names and locations of various buildings, classrooms, or other facilities of the school or campus, information identifying the locations of professors or other individuals' offices or classrooms, information indicating where other users are likely located (e.g., based on their class schedules, information indicating where the work or live, or other information), etc. For example, the student application can identify a professor associated with a class in which the particular student is enrolled and can provide the particular student with navigation to the professor's office or a classroom where the professor is likely, or is determined, to be located.

In some implementations, the student application is able to connect certain students, professors, or other individuals, or to connect groups of students, professors, or other individuals. For example, the student application may be able to identify students that are near a particular student and that have the same classes, similar interests, similar studying styles, etc., based on information accessible to the proximity detection system at personal profiles associated with the particular student and/or the other students, professors, or other individuals. For example, a particular user can be enrolled in a class called "Psychology 100" being taught by "Dr. John Doe" and can indicate in a personal profile that they are interested in "social psychology" and prefer to study between the hours of 6:00 PM and 10:00 PM in small groups. The student application associated with the particular student can identify other students that are also enrolled in "Psychology 100" being taught by "Dr. John Doe," for example, based on determining that the other students are located near the particular student during the scheduled time of the class, or based on accessing information at the personal profiles of the other students and determining that the other students are also enrolled in "Psychology 100" being taught by "Dr. John Doe." The student application may also determine students among the other students that are also interested in "social psychology" and that prefer to study between the hours of 6:00 PM and 10:00 PM in small groups. Based on these determinations, the student application may present information to the particular student and/or the other students that identifies the students having the same class, professor, interests, and/or study habits so as to connect the students. In some implementations, the student application may present information to the particular student and/or the other students when the particular student is near the other students (e.g., within a threshold distance or in the same classroom). In some instances, the information presented to the particular student and/or the other students may assign or suggest that the particular student and/or other students work or study together, for example, that they form a study group, work together for a class project focusing on "social psychology," etc.

In other examples, the student application can allow a particular student to identify and/or connect with other students, professors, or other individuals that may have other interests in common with the particular student. For example, a student who is recruiting for a particular club or cause associated with a school or campus may be able to identify other students, professors, or other individuals near the user that are already interested in the focus of the club or cause. As an example, a student who is distributing flyers to recruit fellow students for a college ski and snowboard club may be able to identify other students who are near the student who have indicated that they are interested in skiing or snowboarding at their personal profiles. The student application hosted on the client device associated with the student who is recruiting may present information that identifies the other students, the locations of the other students relative to the recruiting student, or other information relating to the other students (e.g., their names, class status, etc.).

Additionally, in some implementations, a student application can enable interactions between one or more students and one or more professors or other individuals (e.g., teaching assistants, guest lecturers, etc.). For example, a particular student using a student application can provide feedback, answer questions asked by, or ask questions of a professor or another student that is in the same class, or is located near the particular student. In some implementations, the particular student may interact with the other students, professors, or other individuals using the proximity detection system, for example, by interacting via instances of applications associated with the proximity detection system that are hosted by each student's, professor's, or other individual's client devices. In some implementations, the particular student may be able to provide feedback, ask, or answer questions in real-time. For example, a student may be able to indicate to a professor in the same lecture hall that they do not understand a particular topic, may be able to answer quiz questions provided to the particular student (e.g., a quiz provided via or external from the student application), may be able to rate a professor's, guest lecturer's, or other student's performance (e.g., the quality of a professor's lecture, how well they could comprehend a guest lecturer's presentation, or how well they could hear or comprehend a fellow student's presentation), etc. In some implementations, the proximity detection system can aggregate interaction data across multiple students to provide analytics to students, professors, or other individuals. For example, such information may indicate whether students in a certain area of a classroom cannot hear the professor well, based on the students' location data and the students' feedback, can determine an average score for one or more students on a class quiz, etc.

In some implementations, a student application may integrate with other systems associated with providing services to students. For example, a student application instance associated with a particular student may integrate with the student's meal plan or library card, such that the particular student may be able to purchase or check-out a library book based on the proximity detection system determining their location. For example, a user may have their meal plan updated based on the proximity detection system associated with a school's cafeteria determining that the particular student has entered or exited the cafeteria or passed through a meal checkout line. In another example, the particular student may be able to check-out a library book based on the particular student being detected as being near a checkout counter of the library, etc.

In some implementations, the proximity detection system may enable a particular student to access certain areas or facilities associated with a school or campus. For example, based on the proximity detection system determining that a particular student is near the entrance of a library, gym, building, computer laboratory, cafeteria, etc., associated with a school or campus, and based on the particular student having permission to access the area, the proximity detection system may allow the particular student to access the area (e.g., by unlocking a door to the library, gym, building, computer laboratory, cafeteria, etc.).

In a similar way that students or other visitors of a school or campus may be associated with instances of a student-specific version of an application associated with a proximity detection system for the school or campus, professors or other individuals associated with the school or campus may also be associated with instances of an educator-specific version of an application associated with the proximity detection system for the school or campus. The proximity detection system may provide the professor or other individual using the educator application with location-based and/or other services which may be different from or similar to those provided to the students using the instances of the student application.

For example, the educator application may provide professors or other individuals with navigation services that allow the professor or other individual to navigate to particular destinations within the school or campus. As described, providing the navigation services may involve determining a location of the professor or other individual, determining a route to a destination, and presenting directions, a map, or other navigation that the professor or other individual can use to navigate to the destination. In some implementations, an educator application may be able to access information associated with the professor or other individual, for example, the professor's class schedule and/or meeting schedule (e.g., a Microsoft Outlook calendar) and can suggest or automatically determine a destination for the professor or other individual. In some implementations, the educator application can estimate the commute time for the educator to a particular destination, and can provide notifications or other information relating to the commute to the destination to the professor or other individual. For example, the educator application can provide information that suggests that a professor should start to walk to their next class based on a time of the class and an estimated walk time that is determined based on the professor's current location, information indicating that a particular sidewalk is closed and therefore that the professor should take an alternate route to their destination, etc.

Additionally, as described with respect to the student application, a professor or other individual using an educator application may be provided with access to various areas based on their location as determined by the proximity detection system. For example, the proximity detection system may determine that a particular professor is near their office, and may therefore provide the professor with access to their office, for instance, by unlocking the door of their office. In some implementations, access to a particular area may be provided based on determining that the professor or other individual has not yet arrived but is near or en route to the area or based on other information. For example, a classroom may be unlocked based on determining that the class is about to start even if the professor is not yet present at the classroom but is nearby or is commuting to the classroom.

In other implementations, an educator application associated with a proximity detection system for a school or campus may access information obtained or received by one or more student application instances. For example, a professor's educator application that is hosted on their client device may be able to access attendance data for a class. Based on determining that one or more client devices hosting student applications that are associated with students of the class are located in an assigned classroom during a time of the class, the proximity detection system may determine that those students are present at the class and that other students are absent from the class. This attendance information may then be accessible to the educator application associated with the professor's client device.

In other implementations, the educator application may enable a professor or other individual to identify students or visitors in a class. For example, the educator application may be able to track and present the locations of one or more students in a classroom, e.g., on a map of the classroom, a seating chart for the classroom, as a list of student names and their seating locations, etc. The educator application may enable the professor or other individual to determine which students are seated where, and to access additional information about the student (e.g., their current grade in the class, their attendance history, etc.). This may help the professor or other individual to properly address the students by name, or may provide other benefits (e.g., knowing which students are asking the most questions or participating the most in class).

In some examples, the proximity detection system may determine that an intruder is in a class (e.g., a student with a student application on their client device who is not enrolled in the class is in the classroom during the class), and may provide a notification to the professor or other individual associated with the educator application, or may provide notification to the intruder (e.g., via the student application on their client device), indicating that there is someone in the class who should not be in the class.

In some implementations, the educator application may enable a professor or other individual to access additional information or to provide feedback regarding particular students. For example, a professor may use their educator application to review a personal profile, personal information, photograph, attendance history, grades, exam performance, class participation, etc., associated with a particular student in the class. In some implementations, the professor can access the information by being presented with information identifying the locations of one or more students and selecting a particular student for whom they would like to view more information. In some implementations, a professor or other individual may be able to take notes or provide feedback on one or more students in a class using the educator application.

In some implementations, an educator application may enable a professor or other individual to interact with one or more students in a classroom or other setting. For example, a professor may be able to utilize an educator application instance on their client device to ask or answer questions of one or more students, to conduct quizzes in their class by asking questions and grading answers provided by one or more students, to solicit and receive feedback relating to a lecture or class (e.g., anonymous feedback on the quality of the lecture or class), or to distribute examinations, grades, readings, quizzes, or other communications or content to one or more students. In some implementations, the educator application may only solicit or distribute information to students that are detected as being present at the location of the class at the time of the class (e.g., such that absent students do not have an opportunity to participate in a class quiz issued by the professor). In some instances, a professor or other individual may be able to determine the locations of students that are they are interacting with or that are otherwise associated with the professor or other individual. For example, a professor may be presented with information indicating a location in a classroom of a student who has asked a certain question, may be able to determine that a student is running late but is coming to the class, that a student has left the class, etc.

In some implementations, an educator application may enable professors or other individuals to identify information about one or more students or visitors, such that the educator may divide the students or visitors into groups. For example, the educator may be able to divide the groups based on the performance (e.g., grades) of various students in the class, may be able to divide the groups based on preferences or interests of the students or visitors (e.g., to identify a group of students that prefer to study between 6:00 PM and 10:00 PM and that are interested in "social psychology"), or to identify groups of students based on other factors. The educator application can enable the professor or other individual to identify groups of students or visitors based on a combination of multiple factors to enable the professor or individual to form groups of students that meet a standard or "mix" desired by the professor or individual.

In some implementations, the proximity detection system can aggregate information for multiple students or visitors, multiple classes, multiple locations, or multiple professors or other individuals to provide analytics based on the aggregated information. For example, the proximity detection system can determine and present information at an educator application that shows an average grade point average (GPA) or grade for a particular class, can show how the GPAs of one professor's students compare to the GPAs of other professors students, can show how the performance for one group of students or students in a certain area of a classroom or lecture hall compare to the performance of other groups of students or students in other areas of a classroom or lecture hall, or can provide various other analytics based on a combination of student or visitor locations, professor or other individual location, or personal profile information associated with the students, visitors, professors, or other individuals. In some implementations, the proximity detection system can aggregate such information to determine patterns of behavior for people or groups of people or to provide optimization of various operations of the school or campus, e.g., to help coordinate where certain classes will be held to reduce the amount of walking by students and professors.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
receiving, by one or more computers and from an application instance operating on a client device, educational information indicating (i) a student identifier corresponding to a student associated with the client device, (ii) a beacon identifier associated with a wireless proximity beacon that is associated with a physical location within an educational property, and (iii) a proximity of the client device to the wireless proximity beacon associated with the beacon identifier;
receiving, by the one or more computers, a student profile indicating (i) one or more classes in which the student associated with the client device is enrolled, (ii) a schedule specifying a location and a meeting time for each of the one or more classes in which the student associated with the client device is enrolled, and (iii) one or more extracurricular activities for which the student associated with the client device is signed up;
determining, by the one or more computers, that the proximity of the client device to the wireless proximity beacon satisfies a threshold proximity;
based at least on (i) determining that the proximity of the client device to the wireless proximity beacon satisfies the threshold proximity, and (ii) the received student profile, determining, by the one or more computers, an action that the application instance operating on the client device is permitted to perform while the proximity of the client device to the wireless proximity beacon satisfies the threshold proximity; and
transmitting, by the one or more computers and to the client device, educational information that enables the application instance operating on the client device to perform the action.

2. The computer-implemented method of claim 1, comprising:
determining, based at least on (i) the physical location within the educational property associated with the wireless proximity beacon, and (ii) the proximity of the client device to the wireless proximity beacon, an estimated physical location of a student associated with the client device within the educational property.

3. The computer-implemented method of claim 2, comprising:
determining, based at least on the schedule specifying the location and the meeting time associated with each of the one or more classes in which the student associated with the client device is enrolled, an expected location of the student associated with the client device during each of the one or more classes in which the student associated with the client device is enrolled; and
determining, based at least on a current time, a current expected location of the student associated with the client device during a particular class of the one or more classes in which the student associated with the client device is enrolled;

transmitting, to a client device associated with an administrator, information that indicates (i) the expected location of the student associated with the client device during each of the one or more classes in which the student associated with the client device is enrolled, and (ii) the current expected location of the student associated with the client device during the particular class of the one or more classes in which the student associated with the client device is enrolled.

4. The computer-implemented method claim 3, comprising:

comparing the estimated physical location of the student associated with the client device and the current expected physical location of the student associated with the client device;

based at least on comparing the estimated physical location of the student associated with the client device and the current expected physical location of the student associated with the client device, determining a proximity of the estimated physical location of the student associated with the client device and the expected physical location of the student associated with the client device;

determining that the proximity of the estimated physical location of the student associated with the client device and the expected physical location of the student associated with the client device does not satisfy a threshold value; and based at least on determining that the proximity of the estimated physical location of the student associated with the client device and the expected physical location of the student associated with the client device does not satisfy the threshold value, determining that the student associated with the client device is absent from the particular class of the one or more classes in which the student associated with the client device is enrolled.

5. The computer-implemented method of claim 1, wherein:

receiving, from the application instance operating on the client device, information indicating the beacon identifier associated with the wireless proximity beacon that is associated with a physical location within an educational property comprises receiving, from an application instance operating on a client device, information indicating a beacon identifier associated with a wireless proximity beacon that is associated with a physical location where an extracurricular event is scheduled to take place; and determining that the proximity of the client device to the wireless proximity beacon satisfies a threshold proximity comprises determining that a proximity of a client device satisfies a threshold proximity to the physical location where the extracurricular event is scheduled to take place.

6. The computer-implemented method of claim 5, comprising:

determining, based at least on determining that a proximity of a client device satisfies a threshold proximity to the physical location where the extracurricular event is scheduled to take place, that a user associated with the client device is present in the physical location where the extracurricular event is scheduled to take place; and in response to determining that a user associated with the client device is present in the physical location where the extracurricular event is scheduled to take place, increasing a value corresponding to an amount of individuals present in the physical location where the extracurricular event is scheduled to take place.

7. The computer-implemented method of claim 1, comprising:

receiving, from one or more application instances operating on each of one or more corresponding client devices, information indicating (i) a student identifier associated with the client device, (ii) a beacon identifier associated with a wireless proximity beacon that is associated with a physical location within the property, and (iii) a proximity of the client device to the wireless proximity beacon associated with the beacon identifier; and determining, based on the information received from each of the one or more application instances operating on each of the one or more corresponding client devices, a number of client devices located in each of one or more regions that are defined within the property.

8. The computer-implemented method of claim 7, comprising:

determining, based at least on the number of client devices located in each of the one or more regions that are defined within the property, one or more event attendances that indicate the number of client devices per unit area for a corresponding one or more of the regions that are defined within the property.

9. The computer-implemented method of claim 1, wherein:

determining the action that the application instance operating on the client device is permitted to perform while the proximity of the client device to the wireless proximity beacon satisfies the threshold proximity comprises determining a document to provide for output at a display of the client device, wherein the document is identified as relevant to the physical location within the property associated with the wireless proximity beacon; and transmitting, to the client device, information that enables the application instance operating on the client device to perform the action comprises transmitting, to the client device, information that enables the application instance operating on the client device to provide the document for output at the display of the client device.

10. A system comprising:

one or more processing elements; and non-transitory computer-readable storage media storing instructions that, when executed by the one or more processing elements, cause the system to:

receiving, from an application instance operating on a client device, educational information indicating (i) a student identifier corresponding to a student associated with the client device, (ii) a beacon identifier associated with a wireless proximity beacon that is associated with a physical location within an educational property, and (iii) a proximity of the client device to the wireless proximity beacon associated with the beacon identifier;

receiving a student profile indicating (i) one or more classes in which the student associated with the client device is enrolled, (ii) a schedule specifying a location and a meeting time for each of the one or more classes in which the student associated with the client device is enrolled, and (iii) one or more extracurricular activities for which the student associated with the client device is signed up;

determining that the proximity of the client device to the wireless proximity beacon satisfies a threshold proximity;

based at least on (i) determining that the proximity of the client device to the wireless proximity beacon satisfies the threshold proximity, and (ii) the received student profile, determining an action that the application instance operating on the client device is permitted to perform while the proximity of the client device to the wireless proximity beacon satisfies the threshold proximity; and transmitting, to the client device, educational information that enables the application instance operating on the client device to perform the action.

11. The system of claim 10, comprising:

determining, based at least on (i) the physical location within the educational property associated with the wireless proximity beacon, and (ii) the proximity of the client device to the wireless proximity beacon, an estimated physical location of a student associated with the client device within the educational property.

12. The system of claim 11, comprising:

determining, based at least on the schedule specifying the location and the meeting time associated with each of the one or more classes in which the student associated with the client device is enrolled, an expected location of the student associated with the client device during each of the one or more classes in which the student associated with the client device is enrolled; and determining, based at least on a current time, a current expected location of the student associated with the client device during a particular class of the one or more classes in which the student associated with the client device is enrolled;

transmitting, to a client device associated with an administrator, information that indicates (i) the expected location of the student associated with the client device during each of the one or more classes in which the student associated with the client device is enrolled, and (ii) the current expected location of the student associated with the client device during the particular class of the one or more classes in which the student associated with the client device is enrolled.

13. The system claim 12, comprising:

comparing the estimated physical location of the student associated with the client device and the current expected physical location of the student associated with the client device;

based at least on comparing the estimated physical location of the student associated with the client device and the current expected physical location of the student associated with the client device, determining a proximity of the estimated physical location of the student associated with the client device and the expected physical location of the student associated with the client device;

determining that the proximity of the estimated physical location of the student associated with the client device and the expected physical location of the student associated with the client device does not satisfy a threshold value; and based at least on determining that the proximity of the estimated physical location of the student associated with the client device and the expected physical location of the student associated with the client device does not satisfy the threshold value, determining that the student associated with the client device is absent from the particular class of the one or more classes in which the student associated with the client device is enrolled.

14. The system of claim 10, wherein:

receiving, from the application instance operating on the client device, information indicating the beacon identifier associated with the wireless proximity beacon that is associated with a physical location within an educational property comprises receiving, from an application instance operating on a client device, information indicating a beacon identifier associated with a wireless proximity beacon that is associated with a physical location where an extracurricular event is scheduled to take place; and determining that the proximity of the client device to the wireless proximity beacon satisfies a threshold proximity comprises determining that a proximity of a client device satisfies a threshold proximity to the physical location where the extracurricular event is scheduled to take place.

15. The system of claim 14, comprising:

determining, based at least on determining that a proximity of a client device satisfies a threshold proximity to the physical location where the extracurricular event is scheduled to take place, that a user associated with the client device is present in the physical location where the extracurricular event is scheduled to take place; and in response to determining that a user associated with the client device is present in the physical location where the extracurricular event is scheduled to take place, increasing a value corresponding to an amount of individuals present in the physical location where the extracurricular event is scheduled to take place.

16. The system of claim 10, comprising:

receiving, from one or more application instances operating on each of one or more corresponding client devices, information indicating (i) a student identifier associated with the client device, (ii) a beacon identifier associated with a wireless proximity beacon that is associated with a physical location within the property, and (iii) a proximity of the client device to the wireless proximity beacon associated with the beacon identifier; and determining, based on the information received from each of the one or more application instances operating on each of the one or more corresponding client devices, a number of client devices located in each of one or more regions that are defined within the property.

17. The system of claim 16, comprising:

determining, based at least on the number of client devices located in each of the one or more regions that are defined within the property, one or more event attendances that indicate the number of client devices per unit area for a corresponding one or more of the regions that are defined within the property.

18. A non-transitory computer-readable storage media storing executable instructions that, when executed by at least one processor, cause the at least one processor to perform operations comprising:

receiving, from an application instance operating on a client device, educational information indicating (i) a student identifier corresponding to a student associated with the client device, (ii) a beacon identifier associated with a wireless proximity beacon that is associated with a physical location within an educational property, and (iii) a proximity of the client device to the wireless proximity beacon associated with the beacon identifier;

receiving a student profile indicating (i) one or more classes in which the student associated with the client device is enrolled, (ii) a schedule specifying a location and a meeting time for each of the one or more classes in which the student associated with the client device is enrolled, and (iii) one or more extracurricular activities for which the student associated with the client device is signed up;

determining that the proximity of the client device to the wireless proximity beacon satisfies a threshold proximity;

based at least on (i) determining that the proximity of the client device to the wireless proximity beacon satisfies the threshold proximity, and (ii) the received student profile, determining an action that the application instance operating on the client device is permitted to perform while the proximity of the client device to the wireless proximity beacon satisfies the threshold proximity; and transmitting, to the client device, educational information that enables the application instance operating on the client device to perform the action.

* * * * *